United States Patent
Saito et al.

(10) Patent No.: US 9,459,114 B2
(45) Date of Patent: Oct. 4, 2016

(54) VEHICLE INFORMATION PROVIDING DEVICE

(71) Applicant: Nissan Motor Co., Ltd., Yokohama-shi, Kanagawa (JP)

(72) Inventors: Daisuke Saito, Ebina (JP); Hirofumi Inoue, Yamato (JP); Toshiro Muramatsu, Zushi (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/653,938

(22) PCT Filed: May 31, 2013

(86) PCT No.: PCT/JP2013/065168
§ 371 (c)(1),
(2) Date: Jun. 19, 2015

(87) PCT Pub. No.: WO2014/103402
PCT Pub. Date: Jul. 3, 2014

(65) Prior Publication Data
US 2015/0345977 A1    Dec. 3, 2015

(30) Foreign Application Priority Data

Dec. 27, 2012   (JP) .................................. 2012-284277

(51) Int. Cl.
  *G01C 21/36* (2006.01)
  *G01C 21/34* (2006.01)
  (Continued)

(52) U.S. Cl.
  CPC ............. *G01C 21/3605* (2013.01); *B60L 3/00* (2013.01); *B60L 11/1809* (2013.01);
  (Continued)

(58) Field of Classification Search
  CPC .................................................. G01C 21/3469
  See application file for complete search history.

(56) References Cited

U.S. PATENT DOCUMENTS

| | | | | |
|---|---|---|---|---|
| 5,557,522 A | * | 9/1996 | Nakayama | ......... G01C 21/3446 701/410 |
| 6,249,740 B1 | * | 6/2001 | Ito | .......................... G01C 21/34 340/910 |

(Continued)

FOREIGN PATENT DOCUMENTS

| | | |
|---|---|---|
| JP | 2010-286460 A | 12/2010 |
| JP | 2011-38845 A | 2/2011 |

(Continued)

*Primary Examiner* — Todd Melton
*Assistant Examiner* — Jason Roberson
(74) *Attorney, Agent, or Firm* — Global IP Counselors, LLP

(57) ABSTRACT

A vehicle information providing device provides route information to vehicles. The vehicle information providing device has a history information accumulation unit that sequentially acquires at least one of driving location information, power consumption information and charging location information from vehicle-mounted devices of a plurality of vehicle, and accumulates this as driving history information. A presentation route determination unit extracts driving location information from the history information accumulation unit, searches for a route that has been traveled from a departure point range to a destination point range from among the traveled routes, and determines the searched route as a presentation route. A presentation information determination unit extracts driving history information from the history information accumulation unit and determines one of power consumed while traveling and charging hubs passed when driving along the presentation route. A presentation information provision unit provides information regarding determination results.

9 Claims, 16 Drawing Sheets

(51) Int. Cl.
   *B60L 3/00* (2006.01)
   *B60L 11/18* (2006.01)

(52) U.S. Cl.
   CPC ..... *G01C 21/3461* (2013.01); *G01C 21/3469* (2013.01); *G01C 21/3484* (2013.01); *B60L 2240/62* (2013.01); *Y02T 10/7005* (2013.01); *Y02T 10/7072* (2013.01); *Y02T 10/7291* (2013.01); *Y02T 90/14* (2013.01); *Y02T 90/16* (2013.01); *Y02T 90/161* (2013.01); *Y02T 90/162* (2013.01)

(56) References Cited

U.S. PATENT DOCUMENTS

| | | | | |
|---|---|---|---|---|
| 8,825,403 | B1 * | 9/2014 | Kadous | G01C 21/32 701/527 |
| 2008/0319596 | A1 * | 12/2008 | Yamada | B60K 6/442 701/22 |
| 2010/0292916 | A1 * | 11/2010 | Kurciska | G01C 21/3453 701/533 |
| 2012/0158229 | A1 * | 6/2012 | Schaefer | B60L 11/1842 701/22 |
| 2013/0096818 | A1 * | 4/2013 | Vicharelli | G01C 21/3469 701/423 |
| 2013/0179007 | A1 * | 7/2013 | Dalum | B60W 20/12 701/2 |

FOREIGN PATENT DOCUMENTS

| | | |
|---|---|---|
| JP | 2011-174753 A | 9/2011 |
| JP | 2011-185785 A | 9/2011 |
| JP | 2011-229362 A | 11/2011 |
| JP | 2012-181183 A | 9/2012 |

* cited by examiner

VEHICLE INFORMATION PROVIDING DEVICE

This application is a U.S. National stage application of International Application No. PCT/JP2013/065168, filed May 31, 2013, which claims priority to Japanese Patent Application No. 2012-284277 filed in Japan on Dec. 27, 2012. The entire disclosure of the Japanese Patent Application No. 2012-284277 is hereby incorporated herein by reference.

BACKGROUND

1. Field of the Invention

The present invention relates to an information providing device for a vehicle that provides information such as information regarding the power consumption and charging hubs when driving a vehicle with an electric motor as a drive source to a destination.

2. Background Information

Conventionally, a technology is known in which, in a vehicle with an electric motor as a drive source, a route to the destination is searched for, and the power to be consumed when driving a route based on the power consumption for the entire length of the searched route, as well as per a predetermined unit of distance (hereinafter, also referred to as the theoretical performance of the vehicle) is predicted (refer to, for example, Japanese Laid-Open Patent Application No. 2011-38845). In the technology of Japanese Laid-Open Patent Application No. 2011-38845, when the predicted power consumption is greater than the charged amount of the battery for running the vehicle, the route, as well as information regarding the charging points, which are the points at which the battery for running the vehicle can be charged, are provided.

SUMMARY

The conventional technology described above predicts the power consumption based on the theoretical performance of the vehicle, however, there were cases in which the above-described conventional technology could not appropriately provide the necessary information to the user. In view of the point described above, an object of the present invention is to provide information regarding the power consumption and information regarding the charging hubs that are in accordance with the actual environment.

In the present invention, in order to solve the problem described above, when at least one from among the driving location information, the power consumption information, and the charging position information is sequentially acquired from an on-vehicle device provided to a vehicle with an electric motor as a drive source and is accumulated as the driving history information, and a presentation route is determined by referring to the accumulated driving history information, a predetermined range including a departure point is set as a departure point range; a predetermined range including a destination point input using an input unit is set as a destination point range, with reference to the accumulated driving history information, to determine, as the presentation route, a route traveled from the departure point range to the destination point range, from among the routes traveled by the vehicle; and one piece of information related to the power consumption and/or the charging hubs corresponding to the presentation route is provided.

According to the present invention, the power that is consumed when a vehicle travels and the charging hubs are determined with reference to the driving history information, that is, information that is acquired while the vehicle actually travels; as a result, providing information regarding the power consumption that is in accordance with the actual environment and information regarding the charging hubs is possible according to the present invention.

BRIEF DESCRIPTION OF THE DRAWINGS

Referring now to the attached drawings which form a part of this original disclosure.

DETAILED DESCRIPTION OF THE EMBODIMENTS

Figure 1:
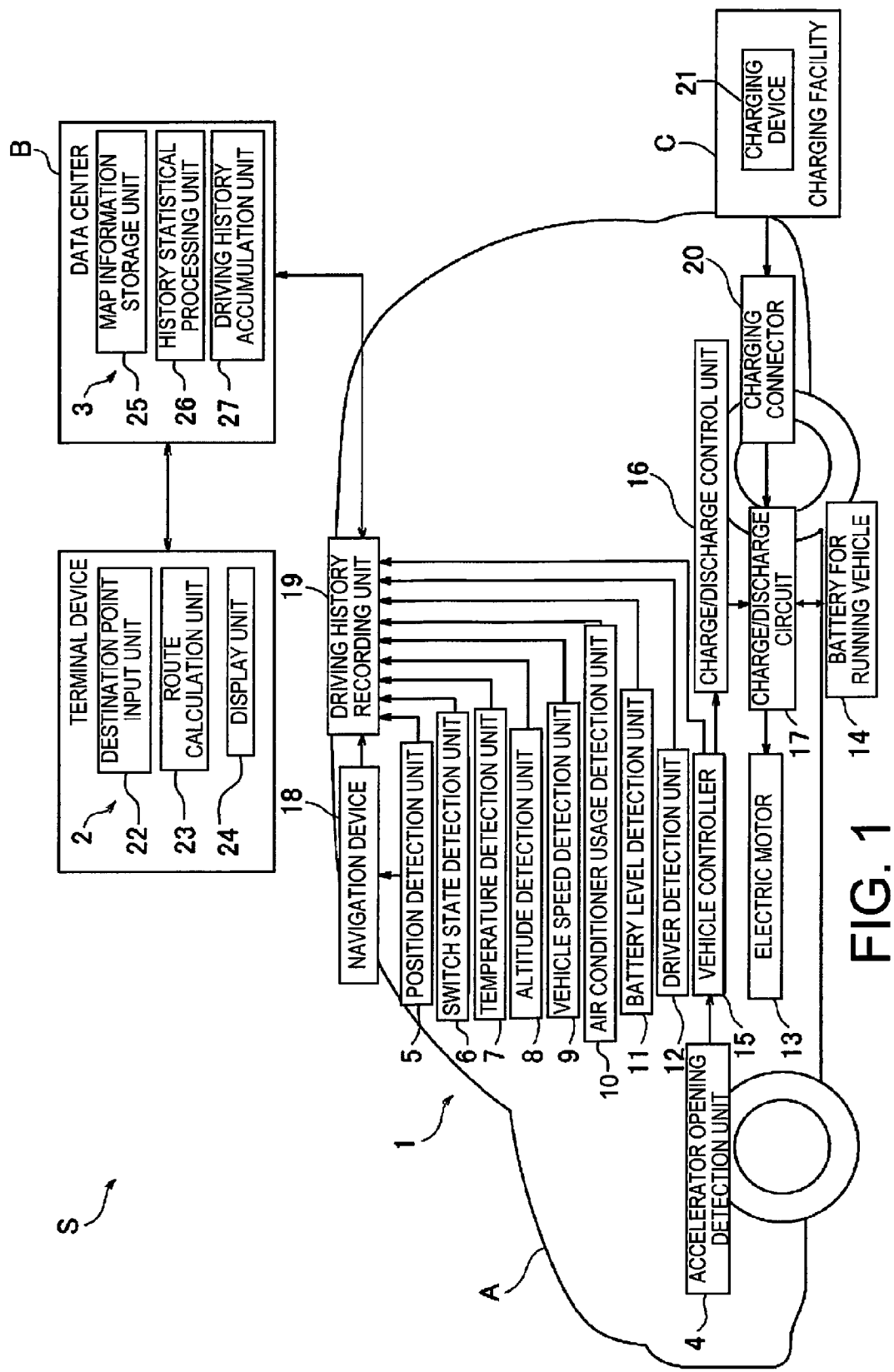
FIG. 1 is a view illustrating a schematic overview of a vehicle information provision system S.

FIG. 1 is a view illustrating a schematic overview of a vehicle information provision system S according to the present embodiment. As illustrated in FIG. 1, the vehicle information provision system S of the present embodiment comprises a vehicle-mounted device 1 that is mounted to a plurality of vehicles A with an electric motor 13 as a drive source, a terminal device 2 possessed by the owner of the vehicle A, and an vehicle information providing device 3 present in a data center B. The vehicle-mounted device and the vehicle information providing device 3, as well as the terminal device 2 and the vehicle information providing device 3, send and receive various types of information via a communication path. Examples of communication paths include a cellular telephone network, a wireless LAN network, a DSRC (Dedicated Short-Range Communications) network, a power line communication network, etc. For example, the configuration can be such that both the vehicle-mounted device 1 and the vehicle information providing device 3 store various types of information in a removable storage medium, such as flash memory, and send and receive the various types of stored information via a terminal having a communication function.

The vehicle-mounted device 1 comprises an accelerator opening detection unit 4, a position detection unit 5, a switch state detection unit 6, a temperature detection unit 7, an altitude detection unit 8, a vehicle speed detection unit 9, an air conditioner usage detection unit 10, a battery level detection unit 11, and a driver detection unit 12.

The accelerator opening detection unit 4 detects the accelerator opening of a host vehicle A. Then, the accelerator opening detection unit 4 outputs the information regarding the detection results to a vehicle controller 15 described below. The position detection unit 5 detects the current position of the host vehicle A (for example, the latitude and longitude) based on a GPS signal transmitted by a GPS (Global Positioning System) satellite. Then, the position detection unit 5 will output the information regarding the detection results to a navigation device 18 described below.

The switch state detection unit 6 detects the switch state of an ignition switch of the host vehicle A. The switch states of the ignition switch may be, for example, an ON state and an OFF state. The switch state detection unit 6 outputs the information regarding the detection results to a driving history recording unit 19 described below. The temperature detection unit 7 detects the temperature of the current position of the host vehicle A. The temperature detection unit 7 outputs the information regarding the detection results to the driving history recording unit 19 described below.

The altitude detection unit 8 detects the altitude of the current position of the host vehicle A. Then, the altitude detection unit 8 outputs the information regarding the detection results to the driving history recording unit 19 described below. The vehicle speed detection unit 9 detects the vehicle speed of the host vehicle A. Then, the vehicle speed detection unit 9 outputs the information regarding the detection results to the driving history recording unit 19 described below. The air conditioner usage detection unit 10 detects the air conditioner usage of the host vehicle A. The air conditioner usage is, for example, the power that is consumed by the air conditioner. The air conditioner usage detection unit 10 outputs the information regarding the detection results to the driving history recording unit 19 described below.

The battery level detection unit 11 detects the battery level of the vehicle A. In the present embodiment, the battery level can be the remaining charge of the battery 14 for running the vehicle to supply electric power to the electric motor 13, which is the drive source. Then, the battery level detection unit 11 outputs the information regarding the detection results to the driving history recording unit 19 described below. The driver detection unit 12 detects the driver ID (Identification) of the driver of the host vehicle A. A driver ID can be, for example, a number, etc. for uniquely identifying the driver. Then, the driver detection unit 12 outputs the information regarding the detection results to the driving history recording unit 19 described below.

The vehicle-mounted device 1 also comprises a vehicle controller 15, a charge/discharge control unit 16, a charge/discharge circuit 17, a navigation device 18, and a driving history recording unit 19.

The vehicle controller 15 acquires the information (accelerator opening) output by the accelerator opening detection unit 4. Then, the vehicle controller 15 outputs the acquired information to the driving history recording unit 19. The vehicle controller 15 outputs a control command to the charge/discharge control unit 16 to supply electric power that corresponds to the accelerator opening to the electric motor 13, based on the acquired information (accelerator opening).

Following the control command from the vehicle controller 15, the charge/discharge control unit 16 outputs a control command to the charge/discharge circuit 17 to supply the electric power that is stored by the battery 14 for running the vehicle to the electric motor 13. Additionally, the charge/discharge control unit 16 detects the charging state and the charging time of the battery 14 for running the vehicle. Charging states may be, for example, the distinction between currently charging and not currently charging. The charging time may be, for example, the time from starting charging to finishing charging. Then, the charge/discharge control unit 16 outputs the information regarding the detection results to the travel history storage unit 19.

The charge/discharge circuit 17 supplies the electric power stored by the battery 14 for running the vehicle to the electric motor 13, following the control command from the charge/discharge control unit 16. The electric motor 13 thereby generates a drive force. The charge/discharge circuit 17 connects with a charging device 21 via a charging connector 20. This type of charging device 21 may be, for example, a device for supplying electric power for charging the battery 14 for running the vehicle, which is provided in a charging facility C that is provided outside the vehicle A. Then, electric power from the charging device 21 is supplied to the charge/discharge circuit 17 with the charging connector 20 being connected to the charging device 21, and the battery 14 for running the vehicle is thereby charged.

The navigation device 18 acquires the information (the latitude and longitude (the current position of the vehicle A)) that is output by the position detection unit 5. Then, the navigation device 18 presents to the driver information for guiding the vehicle A along a route from an departure point $P_O$ to a destination point $P_D$, which are set by the driver, based on the acquired information (the latitude and longitude (the current position of the vehicle A)). The navigation device 18 also outputs the acquired information and the route to the driving history recording unit 19.

The driving history recording unit 19 executes a driving history information recording operation, based on information output from the various detection units 6-12, the vehicle controller 15, the charge/discharge control unit 16, and the navigation device 18.

In the driving history information recording operation, a first piece of driving history information and a second piece of driving history information described below are recorded. Then, the driving history recording unit 19 transmits the recorded first piece of driving history information and the second piece of driving history information to the vehicle information providing device 3. The details regarding the first piece of driving history information, the second piece of driving history information, and the driving history information recording operation are described below.

On the other hand, the terminal device 2 comprises an input unit 22 for destination points, etc., a route calculation unit 23, and a display unit 24. The terminal device 2 may be, for example, a mobile phone terminal, a personal computer, etc. possessed by the owner of the vehicle A.

The input unit 22 for destination points, etc., receives an input of the departure point $P_O$, the destination point $P_D$, the battery level (for example, the battery level of the vehicle A that is possessed by the user), and the driver ID (for example, the driver ID that identifies the user) from the user of the terminal device 2. Then, the input unit 22 for destination points, etc., outputs the received information regarding the departure point $P_O$, the destination point $P_D$, the battery level, and the driver ID to the route calculation unit 23.

The route calculation unit 23 executes a route provision operation based on the information output from the input unit 22 for destination points, etc., specifically, information regarding the departure point $P_O$ and the destination point $P_D$. In the route provision operation, the route calculation unit 23 transmits the search request for the presentation route (hereinafter also referred to as the presentation route search request) to the vehicle information providing device 3. Next, the route calculation unit 23 receives information regarding the presentation route, the power that is consumed when driving along the presentation route, and the location of the charging facilities C (hereinafter also referred to as the charging hubs) that will be traversed when driving along the presentation route from the vehicle information providing device 3. The route calculation unit 23, upon receiving the information from the vehicle information providing device 3, outputs a control signal for displaying the received information to the display unit 24. The details on the route provision operation will be described below. In the present embodiment, an example is described in which the terminal device 2 executes the route provision operation, but another configuration may also be used. That is, for example, the configuration may be such that the position detection unit 5, the route calculation unit 23, and the display unit 24 are realized by a navigation device 18 provided to the vehicle A, and the route provision operation is executed therewith.

Figure 2:
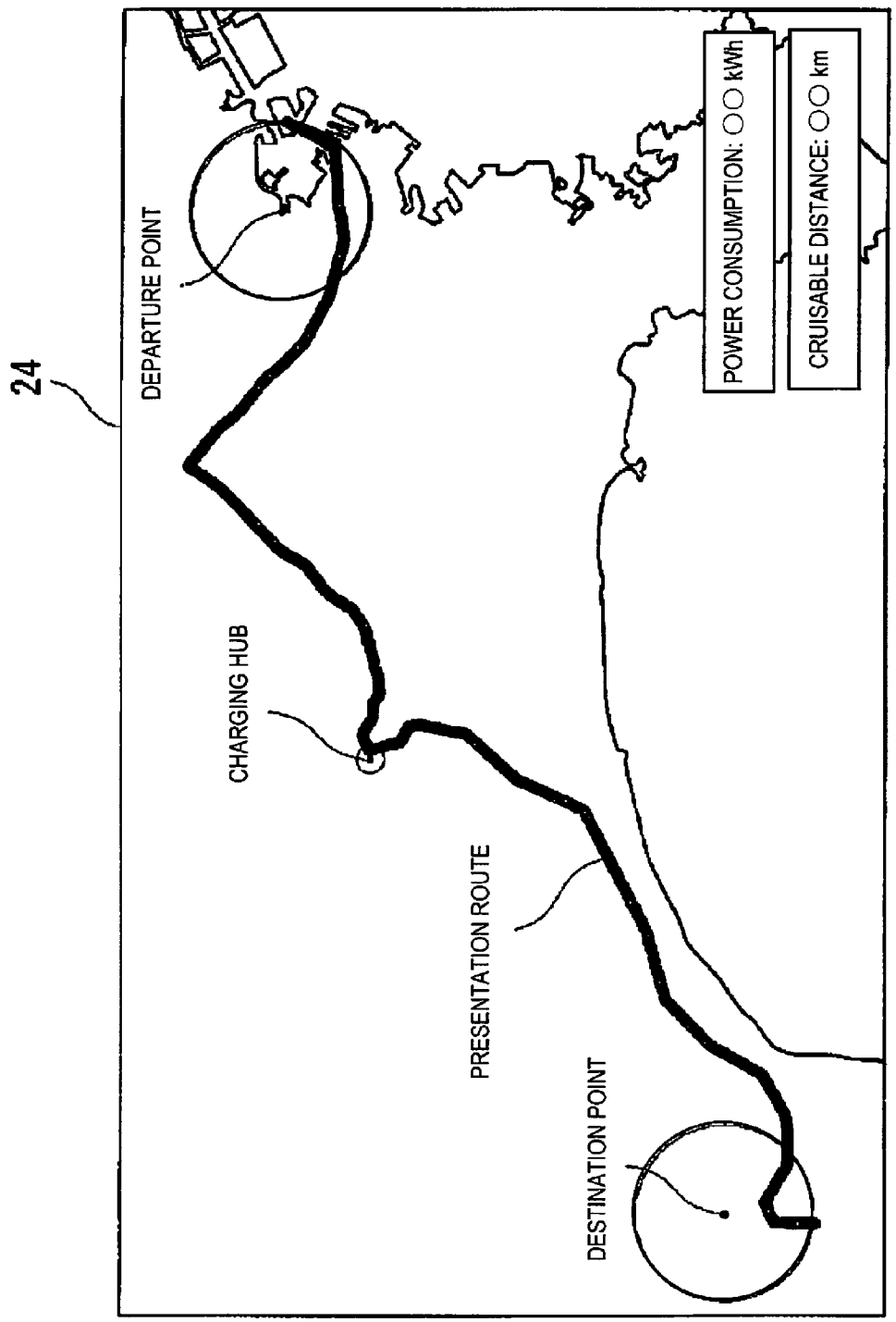
FIG. 2 is a view illustrating one example of the contents displayed by a display unit.

Here, FIG. 2 is a view illustrating one example of the contents displayed by a display unit 24. The display unit 24 displays on the display screen information regarding the presentation route, the power that is consumed when driving along the presentation route, and the charging hubs that will be traversed when driving along the presentation route, following the control command being output by the route calculation unit 23, as illustrated in FIG. 2. The user of the terminal device 2 can thereby confirm beforehand the power consumption and charging hubs when driving the vehicle A to the destination point.

Returning to FIG. 1, the vehicle information providing device 3 comprises a map information storage unit 25, a driving history accumulation unit 26, and a historical statistics processing unit 27.

The map information storage unit 25 stores map information for the region where the vehicle A is traveling. Map information may be, for example, information such as nodes and links that represent a road network, the locations of charging facilities C for charging the battery 14 for running the vehicle provided to the vehicle A, toll roads, and the locations of facilities that are attached to toll roads.

The driving history accumulation unit 26 executes the history information accumulation operation based on the first piece of driving history information and the second piece of driving history information that are transmitted from the vehicle-mounted device 1. Specifically, in the history information accumulation operation, the driving history accumulation unit 26 sequentially receives (acquires) the first piece of driving history information and the second piece of driving history information that are transmitted by the vehicle-mounted device 1. Then, the driving history accumulation unit 26 accumulates the received first piece of driving history information and the second piece of driving history information as the driving history information.

The historical statistics processing unit 27 executes the driving history statistical processing by referencing the presentation route search request transmitted from the terminal device 2, the map information stored in the map information storage unit 25, and the driving history information (the first piece of driving history information, the second piece of driving history information) accumulated by the driving history accumulation unit 26.

In the driving history statistical processing step, first, the historical statistics processing unit 27 searches for (acquires) a planned route from a departure point $P_O$ to the destination point $P_D$ by referencing the map information that is stored by the map information storage unit 25, based on the presentation route search request that is transmitted by the route calculation unit 23. A planned route may be any route that is able to reach a destination point $P_D$ from a departure point $P_O$ and is not particularly limited; for example, a route that is capable of being traveled from a departure point $P_O$ to a destination point $P_D$ in the shortest amount of time is set.

Next, in the driving history statistical processing step, the historical statistics processing unit 27 determines the same or a similar presentation route as the searched (acquired) planned route by referencing the driving history information (the first piece of driving history information) that is accumulated by the driving history accumulation unit 26. This type of method for determining a presentation route will be described below. Next, the historical statistics processing unit 27 determines the power that actually has been consumed by the vehicle A, as well as the charging hubs that will be traversed when driving along the presentation route upon traveling the selected presentation route by referencing the driving history information (the first piece of driving history information, the second piece of driving history information) that is accumulated by the driving history accumulation unit 26. Then, the historical statistics processing unit 27 transmits (provides) the selected presentation route, the power consumption, and the charging hub information to the vehicle-mounted device 1. The vehicle-mounted device 1 thereby presents the presentation route, the power that is consumed upon traveling along the presentation route, and the charging hubs that will be traversed when driving along the presentation route, based on the information output by the historical statistics processing unit 27. The details of the driving history statistical processing step will be described below.

Travel History Information Recording Operation

Figure 3:
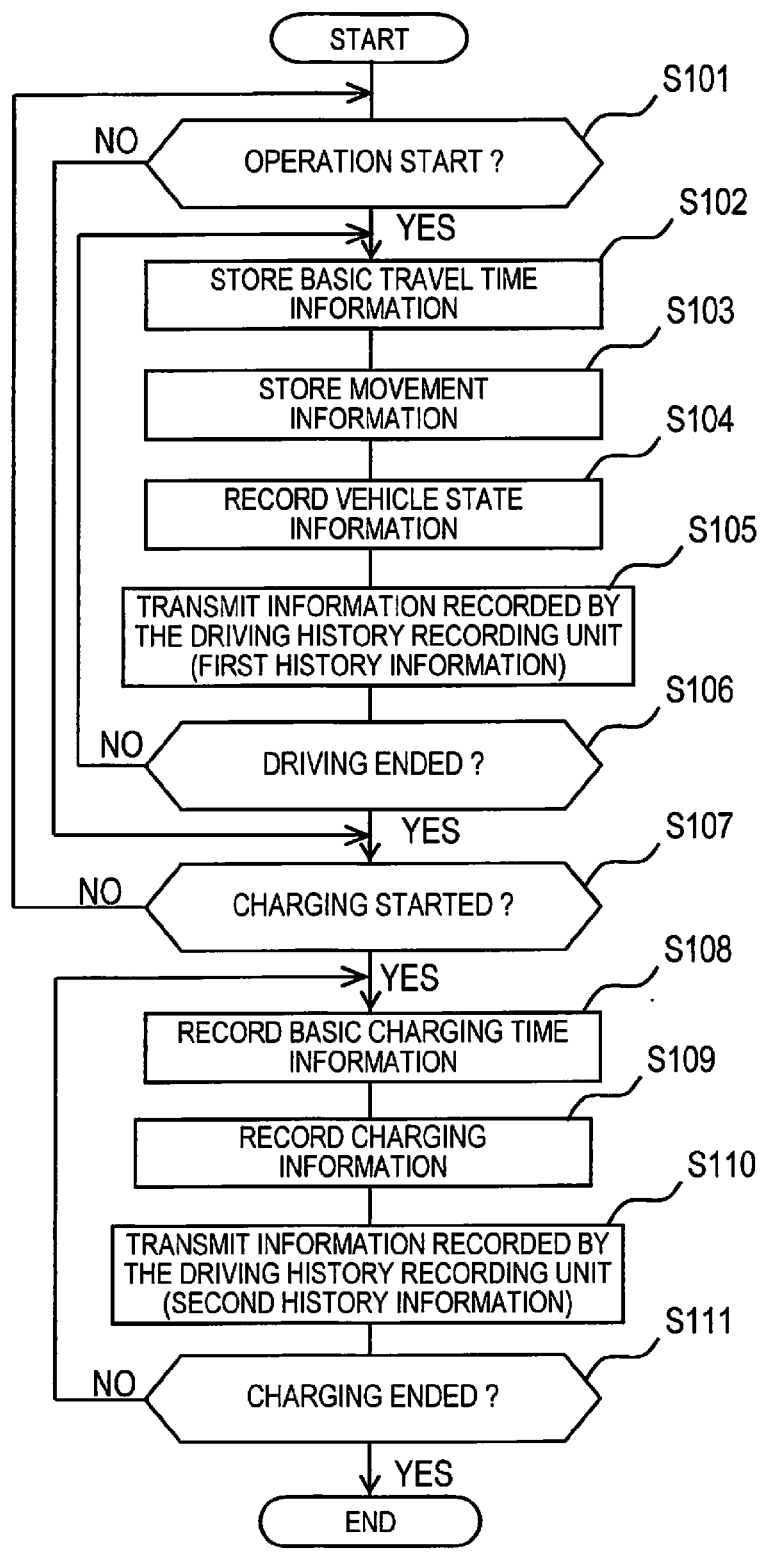
FIG. 3 is a flowchart representing the driving history information recording operation.

Next, the driving history information recording operation that is executed by the driving history recording unit 19 will be described. The driving history recording unit 19 executes a driving history information recording operation each time a predetermined amount of time (for example, 10 milliseconds) has elapsed. FIG. 3 is a flowchart representing the driving history information recording operation.

In step S101, the driving history recording unit 19 determines whether or not the driver has started driving the vehicle A, as illustrated in FIG. 3. Specifically, the driving history recording unit 19 determines whether or not the ignition switch is in an ON state, based on the information (the switch state of the ignition switch) that is output by the switch state detection unit 6. Then, when a determination is made that the ignition switch is in the ON state (step S101=Yes), the driving history recording unit 19 determines that the driver has started driving the vehicle A, and the operation proceeds to step S102. On the other hand, when a determination is made that the ignition switch is in the OFF state (step S101=No), the driving history recording unit 19 determines that the driver has not started driving the vehicle A, and the operation proceeds to step S107.

When a determination is made that the driver has started driving the vehicle A, the operation proceeds to step S102; in step S102, the driving history recording unit 19 records the vehicle ID information, which specifies the vehicle A, the driver ID information, which is output from the driver detection unit 12, the temperature information, which is output from the temperature detection unit 7, and the current date and time information as the basic travel time information. That is, in the present embodiment, the basic travel time information is information comprising the vehicle ID information, the driver ID information, the temperature information, and the current date and time information.

Next, the operation proceeds to step S103, and the driving history recording unit 19 records the latitude and longitude information, as well as the altitude information, output from the position detection unit 5 and the altitude detection unit 8, along with the route information (hereinafter also referred to as the driving location information) as the movement information. That is, in the present embodiment, the movement information includes the latitude and longitude information, the altitude information, and the route information (the driving location information). For example, since the vehicle A can be considered to be traveling along a route that is presented by the navigation device 18, information that is output by the navigation device 18 (route) can be employed as the route.

The operation then proceeds to step S104, and the driving history recording unit 19 records the vehicle speed information, the accelerator opening information, and the air conditioner usage information output from each of the detection units 4, 8, 9, 10 as the vehicle state information. When traveling along the route provided by the navigation device 18 has been completed, the driving history recording unit 19 includes information regarding the power that was consumed upon traveling the route (hereinafter also referred to as the power consumption information) in the vehicle state information to be recorded. That is, in the present embodiment, the vehicle state information included the vehicle speed information, the accelerator opening information, the air conditioner usage information, and information regarding the power consumption (the power consumption information). As an example of a calculation method, the power consumption can be calculated by subtracting the battery level at the time of reaching the destination point $P_D$ from the battery level at the time of departing from the departure point $P_O$ of the route.

The operation then proceeds to step S105, and the driving history recording unit 19 transmits information comprising the basic travel time information, the movement information, and the vehicle state information recorded by the driving history recording unit 19 to the vehicle information providing device 3 as the first piece of driving history information.

The operation then proceeds to step S106, and the driving history recording unit 19 determines whether or not the driver has finished driving the vehicle A. Specifically, the driving history recording unit 19 determines whether or not the ignition switch is in an OFF state, based on the information regarding the switch state of the ignition switch that is output by the switch state detection unit 6. Then, when a determination is made that the ignition switch is in the OFF state (step S106=Yes), the driving history recording unit 19 determines that the driver has finished driving the vehicle A, and the operation proceeds to step S107. On the other hand, when a determination is made that the ignition switch is in the ON state (step S106=No), the driving history recording unit 19 determines that the driver has not finished driving the vehicle A, the operation returns step S102, and the operations of steps S102-S106 are repeatedly executed until a determination is made that the driver has finished driving the vehicle A.

When a determination is made that the driver has finished driving the vehicle A, the operation proceeds to step S107; in step S107, the driving history recording unit 19 determines whether or not the battery 14 for running the vehicle has started charging. Specifically, the driving history recording unit 19 determines whether or not the battery 14 for running the vehicle is in a charging state based on the charging state information of the battery 14 for running the vehicle that is output by the charge/discharge control unit 16. Then, when a determination is made that the battery 14 for running the vehicle is in a charging state (step S107=Yes), the driving history recording unit 19 determines that the battery 14 has started charging, and the operation proceeds to step S108. On the other hand, when a determination is made that the battery 14 for running the vehicle is not in a charging state (step S107=No), the driving history recording unit 19 determines that the battery 14 for running the vehicle has not started charging, the operation returns to step S101, and the operations of steps S101 and S107 are repeatedly executed until driving of the vehicle A has started (step S101=Yes) or the charging of the battery 14 for running the vehicle has started (step S107=Yes).

When the battery 14 for running the vehicle has started charging, the operation proceeds to step S108; in step S108, the driving history recording unit 19 records the temperature information output from the temperature detection unit 7, as well as the current date and time information, as the basic charge time information. That is, in the present embodiment, the basic charge time information includes the temperature information and the current date and time information.

Next, the operation proceeds to step S109, and the driving history recording unit 19 stores the latitude and longitude information output from the position detection unit 5, the battery level detection unit 11, and the charge/discharge control unit 16 (hereinafter also referred to as the charging hub information, the charging position information), the charging amount information, and the charging time information as the charging information. That is, in the present embodiment, the charging information includes the latitude and longitude information (the charging hub information, the charging position information), the charging amount information, and the charging time information.

The operation then proceeds to step S110, and the driving history recording unit 19 transmits information comprising the basic charge time information and the charging information recorded by the driving history recording unit 19 to the vehicle information providing device 3 as the second piece of driving history information. At this time, the driving history recording unit 19 transmits the second piece of driving history information to the vehicle information providing device 3, along with the first piece of driving history information that was transmitted in step S105 described above. The route that the vehicle A traveled is thereby correlated with the charging hubs that were traversed when driving along the route.

The operation then proceeds to step S111, and the driving history recording unit 19 determines whether or not the battery 14 for running the vehicle has finished charging. Specifically, the driving history recording unit 19 determines whether or not the battery 14 for running the vehicle is in a charging state based on the charging state information of the battery 14 for running the vehicle that is output from the charge/discharge control unit 16. Then, when a determination is made that the battery 14 for running the vehicle is not in a charging state (step S111=Yes), the driving history recording unit 19 determines that the battery 14 for running the vehicle has finished charging, and the driving history information recording operation ends. On the other hand, when a determination is made that the battery for running 14 is in a charging state (step S111=No), the driving history recording unit 19 determines that the battery for running 14 has not finished charging, the operation returns to step S108, and the operations of steps S108-S111 are repeatedly executed until a determination is made that the battery 14 for running the vehicle has finished charging.

Route Provision Operation

Figure 4:
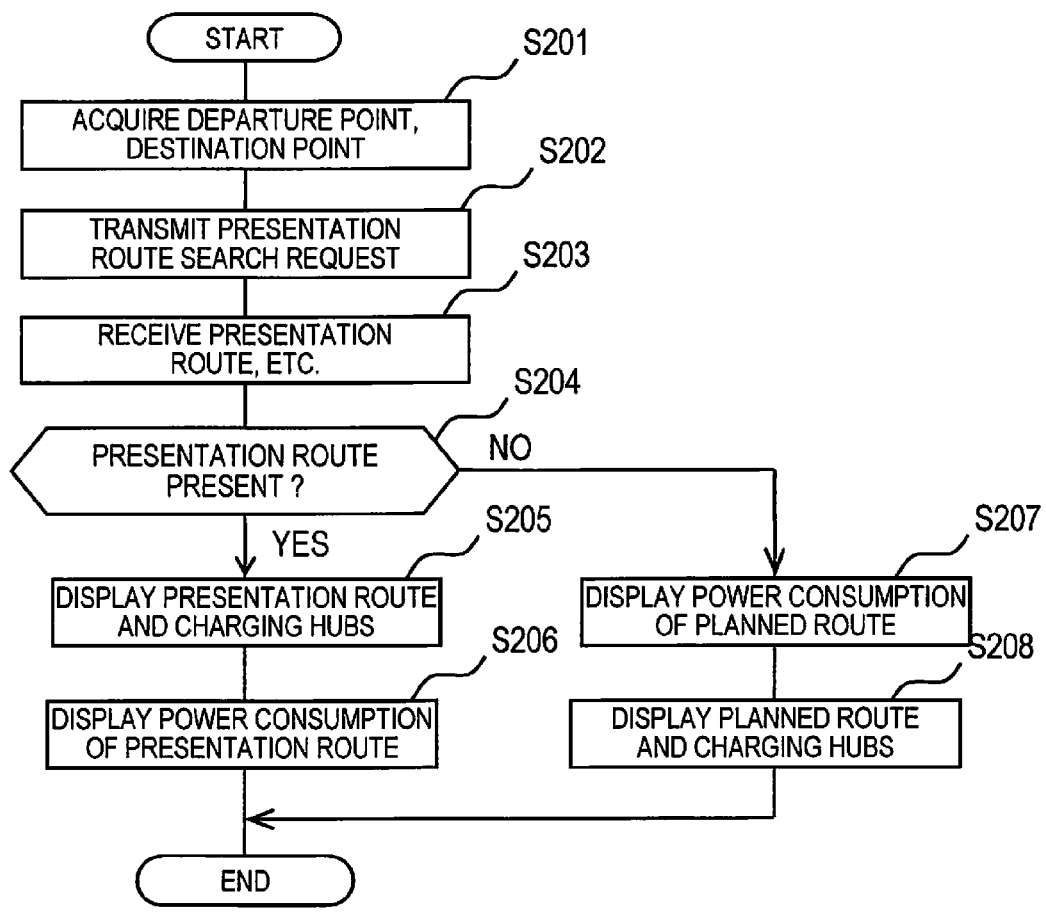
FIG. 4 is a flowchart representing the route provision operation.

Next, the route provision operation that is executed by the route calculation unit 23 will be described. The route calculation unit 23 executes a route provision operation described below when information regarding the departure point $P_O$, the destination point $P_D$, the battery level, and the driver ID are input from the input unit 22 for destination points, etc. FIG. 4 is a flowchart representing the route provision operation.

First, in step S201, the route calculation unit 23 acquires information regarding the departure point $P_O$, the destination point $P_D$, the battery level, and the driver ID output from the input unit 22 for destination points, etc., as illustrated in FIG. 4

The operation then proceeds to step S202, and the route calculation unit 23 transmits a presentation route search request to the vehicle information providing device 3. Specifically, the route calculation unit 23 transmits the presentation route search request, along with information regarding the departure point $P_O$, the destination point $P_D$, the battery level, and the driver ID acquired in step S201 described above, to the vehicle information providing device 3.

Then, in response to the presentation route search request that is output from the route calculation unit 23, the historical statistics processing unit 27 of the vehicle information providing device 3 searches for (acquires) the planned route from the departure point $P_O$ to the destination point $P_D$ by referencing the map information that is stored in the map information storage unit 25. Next, the historical statistics processing unit 27 searches for a route that is identical or similar to the planned route (hereinafter referred to as the similar route) by referencing the first piece of driving history information that is accumulated by the driving history accumulation unit 26, and the searched similar route is determined to be the presentation route. The method for selecting a presentation route will be described below. The historical statistics processing unit 27 then determines the power that has been consumed when driving along the selected presentation route, as well as the charging hubs that will be traversed when driving along the presentation route, by referencing the first piece of driving history information and the second piece of driving history information, which are accumulated by the driving history accumulation unit 26. The method for determining the power consumption and the charging hubs will be described below. Then, the historical statistics processing unit 27 transmits (provides) the selected presentation route, the power consumption, and the charging hub information to terminal device 2. For example, when a presentation route cannot be determined (calculated), such as when a corresponding similar route does not exist, the historical statistics processing unit 27 transmits (provides) information regarding the searched planned route, instead of the presentation route information, to the terminal device 2.

The operation then proceeds to step S203, and the route calculation unit 23 receives information including the presentation route information, the power consumption information, and the charging hub information, which are transmitted by the vehicle information providing device 3. If a presentation route could not be determined in step S202, the route calculation unit 23 receives the planned route information instead of the presentation route information.

The operation then proceeds to step S204, and the route calculation unit 23 determines whether or not the presentation route information was received in step S203. If the route calculation unit 23 determines that the presentation route information has been received (step S204=Yes), the operation proceeds to step S205. On the other hand, if the route calculation unit 23 determines that the planned route information has been received instead of the presentation route information (step S204=No), the operation proceeds to step S207.

If a determination is made that the presentation route information has been received, the operation proceeds to step S205; in step S205, the route calculation unit 23 outputs a control command to the display unit 24 to display the presentation route information and the charging hub information from the information acquired in the above-described step S203 (the presentation route information, the power consumption information, and the charging hub information).

Next, in step S206, the route calculation unit 23 outputs a control command to the display unit 24 to display the power consumption information from the information acquired in the above-described step S203 (the presentation route information, the power consumption information, and the charging hub information), after which the route provision operation ends. A display such as that illustrated in FIG. 2 is thereby displayed on the display screen.

On the other hand, if a determination is made that the presentation route information has not been received, the operation proceeds to step S207; in step S207, the route calculation unit 23 outputs a control command to the display unit 24 to display the planned route information and the charging hub information from the information acquired in the above-described step S203 (the planned route information, the power consumption information, and the charging hub information).

Next, in step S208, the route calculation unit 23 outputs a control command to the display unit 24 to display the power consumption information from the information acquired in the above-described step S203 (the planned route information, the power consumption information, and the charging hub information), after which the route provision operation ends. A display such as that illustrated in FIG. 2 is thereby displayed on the display screen.

History Accumulation Operation

Figure 5:
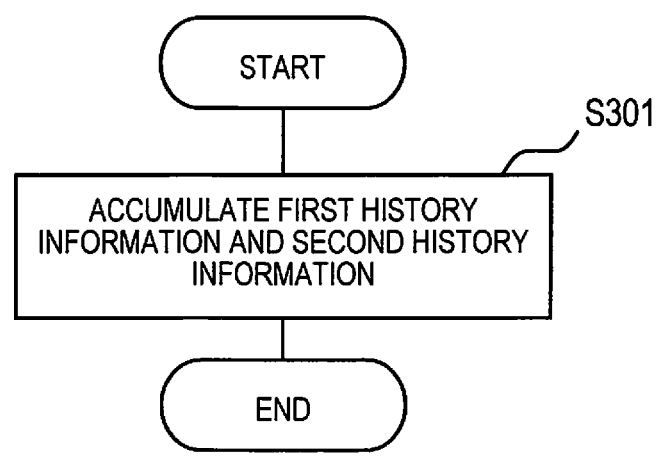
FIG. 5 is a flowchart representing the history accumulation operation.

Next, the history accumulation operation that is executed by the driving history accumulation unit 26 will be described. The driving history accumulation unit 26 executes the history accumulation operation when receiving the first piece of driving history information or the second piece of driving history information from the route calculation unit 23. FIG. 5 is a flowchart representing the history accumulation operation.

In step S301, the driving history accumulation unit 26 accumulates the received first piece of driving history information or the second piece of driving history information as the driving history information, and the history accumulation operation ends, as illustrated in FIG. 5. At this time, the driving history accumulation unit 26 includes information regarding the presence/absence of traffic jams, the day of the week, the season, the weather, the travel time zone, the travel power consumption, and the average speed in the driving history information (the first piece of driving history information, the second piece of driving history information) to be accumulated. For example, the presence/absence of traffic jams on the traveling date/time and along the route, which are included in the first piece of driving history information, can be detected, and the detected information can be used as the information regarding the presence/absence of traffic jams. Information regarding the day of the week may be, for example, the day of the week associated with the traveling date/time, which is included in the first piece of driving history information. Information regarding the season may be, for example, the season associated with the traveling date/time, which is included in the first piece of driving history information. Additionally, the weather on the traveling date/time and at the latitude and longitude, which are included in the first piece of driving history information, can be detected, and the detected information can be used as the information regarding the weather. Information regarding the time zone may be, for example, the time zone associated with the traveling date/time, which is included in the first piece of driving history information. Information regarding the travel power consumption may be, for example, the amount of decrease in the battery level per unit of time while traveling, which is included in the first piece of driving history information. Information regarding the average speed may be, for example, the average value of the vehicle speed over a set period of time (for example, 10 minutes), which is included in the first piece of driving history information.

In the present embodiment, an example was described in which the driving history recording unit 19 uses the route information that is output from the navigation device 18 as the route, but another configuration may also be employed. For example, if the route in the first piece of driving history information includes a portion for which the vehicle A traveled a different route, the driving history accumulation unit 26 corrects the above to the route that the vehicle A actually traveled, based on the driving history information (the latitude and longitude), which is accumulated by the driving history accumulation unit 26. The driving history accumulation unit 26 thereby accumulates information regarding the route that the vehicle A actually traveled. A latitude and longitude sequence or a road link string after a common dead reckoning or a latitude and longitude sequence or a road link string after map matching may be employed as the information regarding the actually traveled route. Dead reckoning is location information that is obtained by, for example, correcting GPS latitude and longitude information detected by the position detection unit 5 with respect to the speed information provided by the vehicle speed detection unit 9. A method for increasing the correction accuracy by considering the gyro-sensor (the acceleration sensor) information, which is not diagrammed, is also known. Map matching is known as a method for detecting the most likely location on the road by detecting whether or not one is traveling on a road by looking at both the GPS latitude and longitude information that is detected by the position detection unit 5 or the latitude and longitude after the above-described dead reckoning, as well as the road link, the node information, and, if during navigation guiding, the route information, which are possessed by the navigation device 18, and if on a road, determining which roads have been passed.

Driving History Statistical Processing

Figure 6:
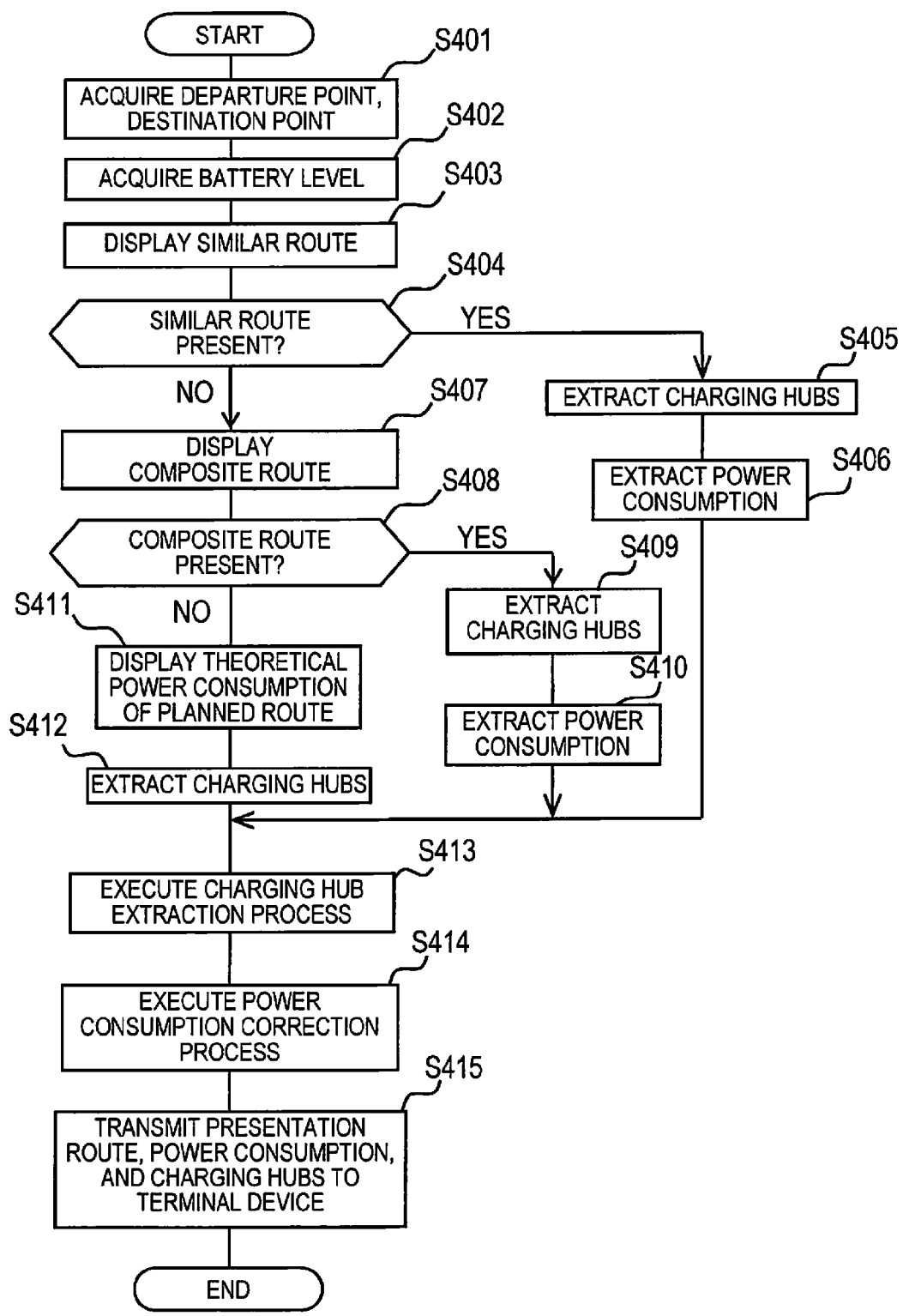
FIG. 6 is a flowchart representing the driving history statistical processing step.

Next, the driving history statistical processing step that is executed by the historical statistics processing unit 27 will be described. The historical statistics processing unit 27 executes the history statistical processing step when receiving the presentation route search request that is transmitted by the terminal device 2. FIG. 6 is a flowchart representing the driving history statistical processing step.

First, in step S401, the historical statistics processing unit 27 acquires the departure point $P_O$ and the destination point $P_D$ from the received presentation route search request, as illustrated in FIG. 6. Next, the historical statistics processing unit 27 searches for (acquires) the planned route from the acquired departure point $P_O$ to the destination point $P_D$, based on the map information that is stored by the map information storage unit 25. A planned route may be any route that is able to reach a destination point $P_D$ from a departure point $P_O$ and is not particularly limited; for example, a route that is capable of leaving a departure point $P_O$ and reaching a destination point $P_D$ in the shortest amount of time is set.

In the present embodiment, an example was described in which the historical statistics processing unit 27 that is provided to the vehicle information providing device 3 searches for (acquires) a planned route, but another configuration may also be used. For example, the configuration may be such that a navigation device 18 provided to the vehicle-mounted device 1 searches for the planned route. In this case, the navigation device 18 transmits the search results of the planned route to the historical statistics processing unit 27, and the historical statistics processing unit 27 transmits (acquires) the planned route transmitted from the navigation device 18.

The operation then proceeds to step S402, and the historical statistics processing unit 27 acquires the battery level information from the received presentation route search request. The method for acquiring the battery level information may be a method for making an inquiry to the battery level detection unit 11 of the vehicle A from the terminal device 2 via the data center B or a method in which the user inputs an arbitrary battery level. According to the former method, the calculation can be done based on the most recent battery level when actually departing; as a result, obtaining a result that is in line with the ordinary state at the current time is possible. According to the latter method, the user can specify the battery level beforehand; therefore, obtaining a result assuming a departure after the battery has been charged 100% is possible.

Figure 7:
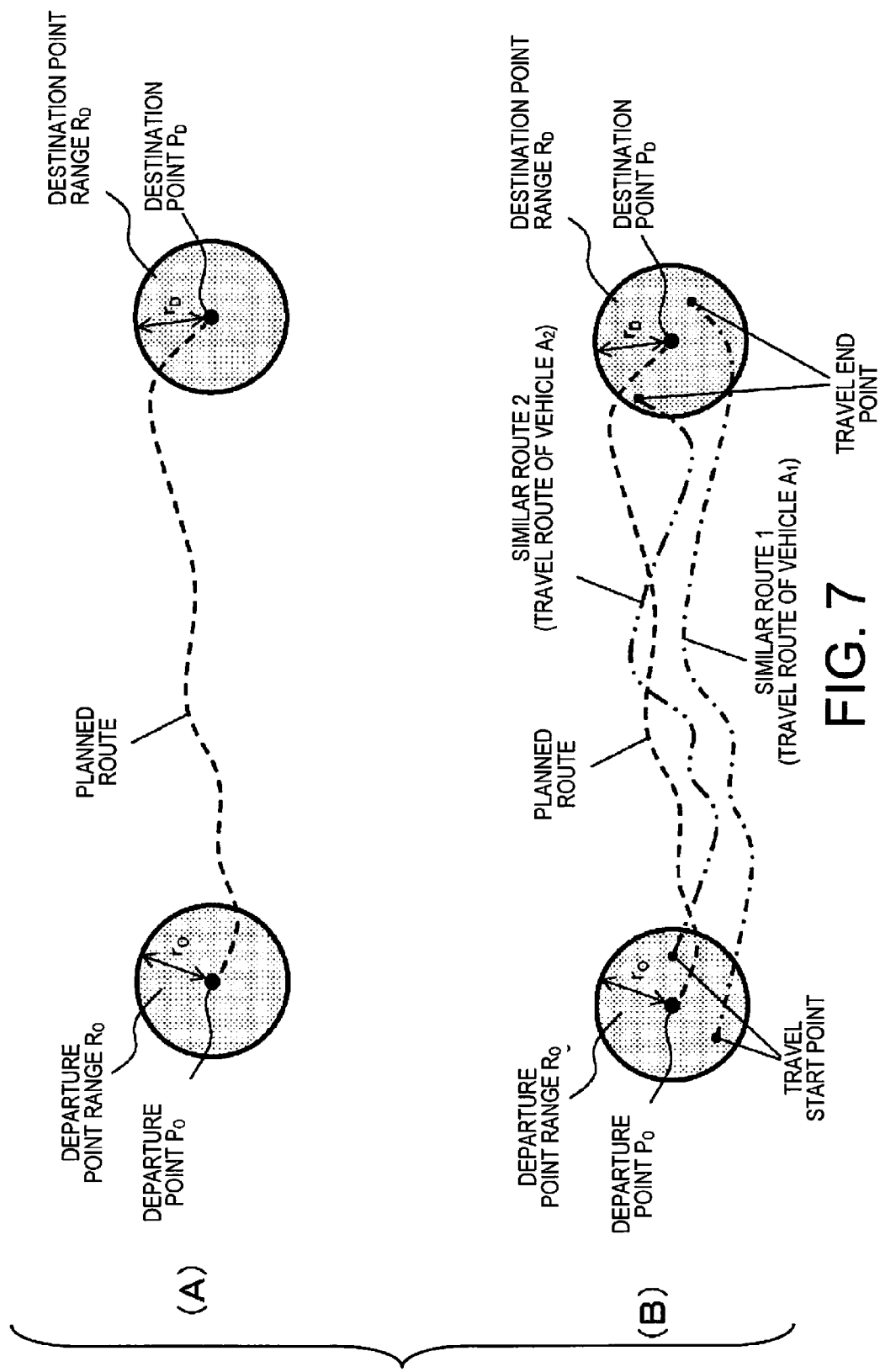
FIG. 7 is a view showing a method for searching for similar routes.

Next, the operation proceeds to step S403; in step S403, the historical statistics processing unit 27 executes a search for a similar route. Specifically, the historical statistics processing unit 27 sets the departure point range $R_O$ and the destination point range $R_D$ based on the departure point $P_O$ and the destination point $P_D$ included in the received presentation route search request. FIG. 7 is a view showing a method for searching for similar routes in the present embodiment. In the present embodiment, the historical statistics processing unit 27 sets a circular range having a radius $r_D$ from the departure point $P_O$ as the departure point range $R_O$ and sets a circular range having a radius $r_D$ from the destination point as the destination point range $R_D$, as illustrated in part (A) of FIG. 7.

Next, from the first piece of driving history information (route) accumulated by the driving history accumulation unit 26, the historical statistics processing unit 27 searches for a route with a travel start point and a travel end point within the set departure point range $R_O$ and the destination point range $R_D$ and determines the searched route as a similar route. Specifically, the historical statistics processing unit 27 sets a route for which the travel start point is within the departure point range $R_O$ and the travel end point is within the destination point range $R_D$ as a similar route. For example, in the example illustrated in part (B) of FIG. 7, an example is shown in which two routes, "similar route 1" and "similar route 2," are detected in relation to the planned route that connects the departure point $P_O$ and the destination point $P_D$.

In the present embodiment, a predetermined distance (for example, 5 km) may be set as the radius $r_O$ and radius $r_D$, which define the magnitude (size) of the departure point range $R_O$ and the destination point range $R_D$. According to the present embodiment, by setting and using a departure point range $R_O$ and a destination point range $R_D$ having a predetermined range when setting a similar route in this way, avoiding situations in which there is no corresponding similar route within the first piece of driving history information (route), which is accumulated by the driving history accumulation unit 26, is possible; as a result, appropriately setting a similar route becomes possible.

In the present embodiment, when, for example, the departure point $P_O$ corresponds to a toll road or a facility that is attached to a toll road (for example, a service area), setting a departure point range $R_O$ that excludes areas like toll roads and facilities attached to toll roads, upon setting a departure point range $R_O$, is possible. In particular, when the departure point $P_O$ corresponds to a toll road or a facility attached to a toll road, a route for which the travel start point is outside of the range of a toll road or a facility that is attached to a toll road is not appropriate to be set as a similar route, even when within a distance range of radius $r_O$ from the departure point $P_O$; therefore, the configuration can be such that this type of range will be excluded from the departure point range $R_O$. The same applies to the destination point $P_D$ and the destination point range $R_D$.

Conversely, when the departure point $P_O$ is in a location outside of a toll road or a facility that is attached to a toll road, setting a departure point range $R_O$ that excludes areas that correspond to toll roads and facilities attached to toll roads, upon setting a departure point range $R_O$, is possible. In particular, when the departure point $P_O$ is in a location outside of a toll road or a facility attached to a toll road, a route for which the travel start point is inside of the range of a toll road or a facility that is attached to a toll road is not appropriate to be set as a similar route, even when within a distance range of radius $r_O$ from the departure point $P_O$; therefore, the configuration can be such that this type of range will be excluded from the departure point range $R_O$. The same applies to the destination point $P_D$ and the destination point range $R_D$.

In the present embodiment, whether or not a departure point $P_O$ or a destination point $P_D$ corresponds to a toll road or a facility that is attached to a toll road may be determined by, for example, referring to the map information that is stored by the map information storage unit 25.

Then, in step S403, the similar route searched for in this way is set as the presentation route. The number of presentation routes is not particularly limited and may be one or a plurality. If a similar route is detected, all of the detected similar routes may be set as presentation routes, or one, two or more similar routes may be selected from all of the detected similar routes, according to a predetermined condition, and made presentation routes. A predetermined condition may be a method for selecting a similar route that is close to the current conditions in consideration of the conditions such as the travel time period (the season, the temperature), the presence/absence of air conditioner use while traveling, etc. A similar route may also be selected in consideration of the magnitude of the power consumption (for example, selecting similar routes with the maximum and minimum power consumption, etc.).

In step S403, the historical statistics processing unit 27 gives up extracting a similar route when a similar route does not exist in the first piece of driving history information (route) accumulated by the driving history accumulation unit 26, that is, when a route having a travel start point and a travel end point within the departure point range $R_O$ and the destination point range $R_D$ does not exist.

The operation then proceeds to step S404, and the historical statistics processing unit 27 determines whether or not a similar route has been extracted in the above-described step S403. Then, if the historical statistics processing unit 27 determines that a similar route has been extracted (step S404=Yes), the operation proceeds to step S405. On the other hand, if the historical statistics processing unit 27 determines that a similar route has not been extracted (the extraction of a similar route was given up) (step S404=No), the operation proceeds to step S407.

If a determination is made that a presentation route has been extracted, the operation proceeds to step S405; in step S405, the historical statistics processing unit 27 extracts the charging hubs that were traversed when driving the similar routes extracted in the above-described step S403 from the second piece of driving history information (charging hubs) accumulated by the driving history accumulation unit 26. For example, the historical statistics processing unit 27 searches for the first piece of driving history information that includes the similar routes extracted in the above-described step S403 within the first piece of driving history information that is accumulated by the driving history accumulation unit 26. Next, the historical statistics processing unit 27 extracts the charging hubs from the second piece of driving history information that is associated with the searched for first piece of driving history information within the second piece of driving history information (charging hubs) that is accumulated by the driving history accumulation unit 26.

The operation then proceeds to step S406, and the historical statistics processing unit 27 extracts the power that is consumed when driving the similar routes extracted in the above-described step S403 from within the first piece of driving history information (the power consumption information) that is accumulated by the driving history accumulation unit 26, after which the operation proceeds to step S413. For example, the historical statistics processing unit 27 extracts the power consumption from the first piece of driving history information, which includes the similar routes extracted in the above-described step S403.

In this manner, in the present embodiment, the historical statistics processing unit 27 extracts the similar routes from the first piece of driving history information that is accumulated by the driving history accumulation unit 26. Then, the historical statistics processing unit 27 extracts information regarding the charging hubs that were traversed when driving the similar routes from the second piece of driving history information that is accumulated by the driving history accumulation unit 26. Next, the historical statistics processing unit 27 extracts the power that was consumed when driving the extracted similar routes from the first piece of driving history information that is accumulated by the driving history accumulation unit 26. Therefore, acquiring more appropriate power consumption and charging hub information is possible. Accordingly, providing power consumption information and charging hub information that are more in accordance with the actual environment is possible.

On the other hand, when a determination is made that a similar route could not be extracted in step S404 described above, the operation proceeds to step S407; in step S407, the historical statistics processing unit 27 searches for (determines) a presentation route that is identical or similar to the planned route (hereinafter also referred to as the composite route), which is formed by combining a plurality of routes, by referencing the first piece of driving history information that is accumulated by the driving history accumulation unit 26.

Figure 8:
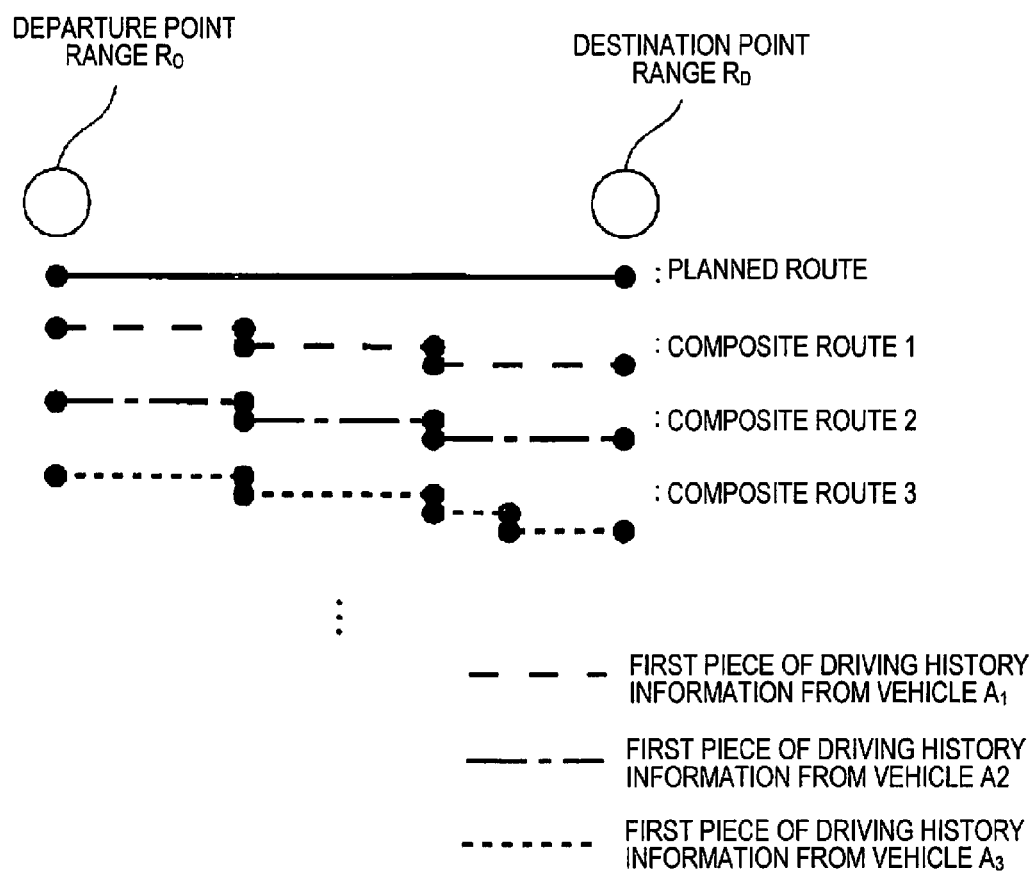
FIG. 8 is an explanatory view representing a composite route.

Here, FIG. 8 is an explanatory view representing a composite route. The historical statistics processing unit 27 forms a composite route by combining a plurality of routes that were traveled by the same vehicle by referencing the first piece of driving history information that is accumulated by the driving history accumulation unit 26, as illustrated in FIG. 8. For example, the historical statistics processing unit 27 first extracts the first piece of driving history information with identical vehicle IDs from the first piece of driving history information that is accumulated by the driving history accumulation unit 26. Next, the historical statistics processing unit 27 extracts routes that have a travel start point within the departure point range $R_O$, which is set in the above-described step S403, and that extend in the destination point range $R_D$ direction, which is set in the above-described step S403, along the planned route. Next, the historical statistics processing unit 27 assigns the travel end point of the route that was extracted in this way as the travel start point, repeatedly performs an operation to extract the route that extends in the destination point range $R_D$, and finally extracts a route having a travel end point within the destination point range $R_D$. The historical statistics processing unit 27 thereby generates a composite route by combining a plurality of extracted routes. The historical statistics processing unit 27 gives up forming a composite route if an appropriate route does not exist within the plurality of first pieces of driving history information accumulated in the driving history accumulation unit 26.

The operation then proceeds to step S408, and the historical statistics processing unit 27 determines whether or not a similar composite route has been formed in the above-described step S407. Then, if the historical statistics processing unit 27 determines that a similar composite route has been formed (step S408=Yes), the operation proceeds to step S409. On the other hand, if the historical statistics processing unit 27 determines that a similar composite route has not been extracted (the extraction of a composite route was given up) (step S408=No), the operation proceeds to step S411.

If a determination is made that a composite route could be formed in step S408, the operation proceeds to step S409; in step S409, the historical statistics processing unit 27 extracts the charging hubs that were traversed when driving along the routes that form the similar composite routes extracted in the above-described step S407 from the second piece of driving history information (charging hubs) accumulated by the driving history accumulation unit 26. For example, the historical statistics processing unit 27 searches for the plurality of first pieces of driving history information that include the traveling routes that form the similar composite routes extracted in the above-described step S407 within the first pieces of driving history information accumulated by the driving history accumulation unit 26. Next, the historical statistics processing unit 27 extracts the charging hub information from the second piece of driving history information that is associated with the searched for first piece of driving history information within the second piece of driving history information (charging hub information) that is accumulated by the driving history accumulation unit 26. The historical statistics processing unit 27 then makes each of the extracted charging hubs the charging hubs that were traversed when driving the similar composite routes formed in the above-described step S407.

The operation then proceeds to step S410, and the historical statistics processing unit 27 extracts the power that is consumed when driving the routes that form the composite routes formed in the above-described step S407 from the first piece of driving history information (the power consumption information) that is accumulated by the driving history accumulation unit 26. For example, the historical statistics processing unit 27 extracts the power consumption information from each of the plurality of first pieces of driving history information, which include the routes that form the composite routes formed in the above-described step S407. The historical statistics processing unit 27 then makes the sum of the extracted power consumption data the power that was consumed when driving the composite routes formed in the above-described step S407.

In this manner, in the present embodiment, the historical statistics processing unit 27 forms a composite route by combining a plurality of routes that were traveled based on the driving history information for the same vehicle from among the first piece of driving history information that is accumulated by the driving history accumulation unit 26. Then, the historical statistics processing unit 27 extracts the charging hubs that were traversed when driving along the routes that form the composite routes from the second piece of driving history information that is accumulated by the driving history accumulation unit 26. Then, the historical statistics processing unit 27 extracts the power that was consumed when driving along the routes that form the composite routes from the first piece of driving history information that is accumulated by the driving history accumulation unit 26. Accordingly, appropriately acquiring the power consumption and charging hub information is possible, even when a similar route (that is, a route that is identical or similar to the planned route) does not exist within the first piece of driving history information that is accumulated by the driving history accumulation unit 26.

Figure 9:
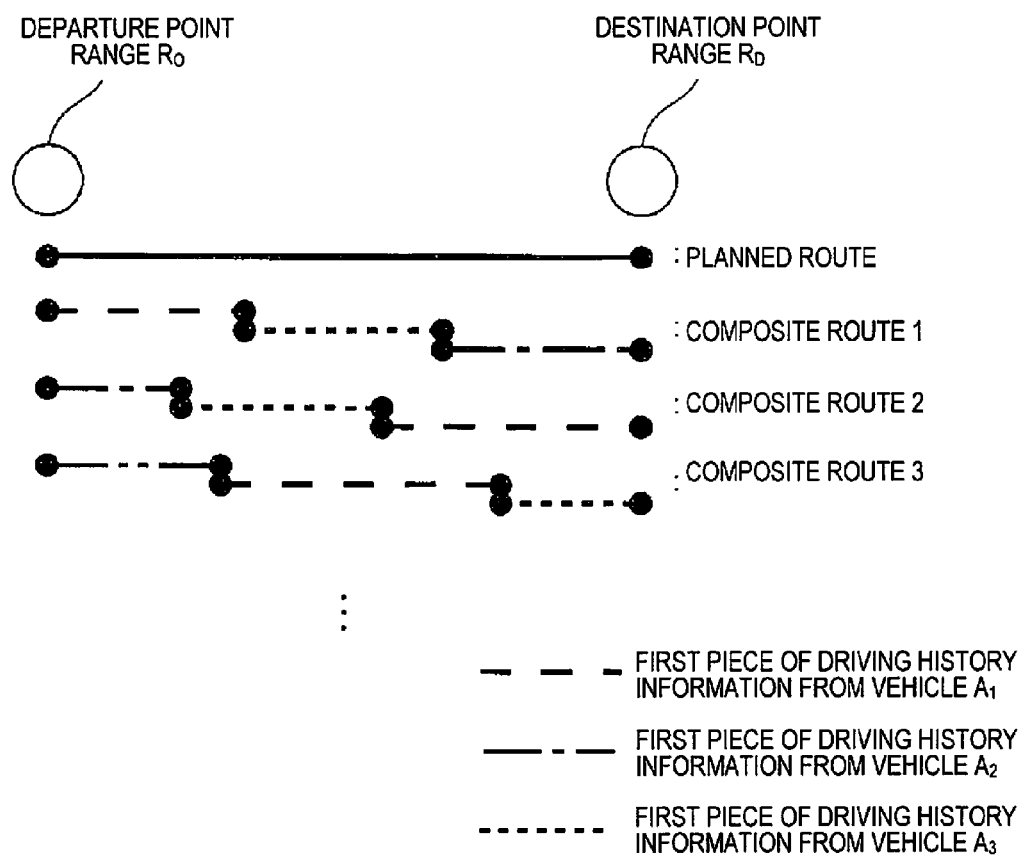
FIG. 9 is an explanatory view representing a modified example of a composite route.

In the present embodiment, an example was described in which the historical statistics processing unit 27 forms a composite route by combining a plurality of routes that were traveled by the same vehicle by referencing the first piece of driving history information that is accumulated by the driving history accumulation unit 26, but another configuration may also be used. For example, as shown in FIG. 9, the configuration can be such that a composite route is formed by combining a plurality of routes that are traveled by a plurality of vehicles by referencing the first piece of driving history information that is accumulated by the driving history accumulation unit 26. Here, FIG. 9 is an explanatory view representing a modified example of a composite route.

On the other hand, if a determination is made in step S408 that a composite route could not be determined, the operation proceeds to step S411; in step S411, the historical statistics processing unit 27 calculates the power that is consumed when driving along the planned route that is searched for in step S401 described above (hereinafter also referred to as the theoretical power consumption), based on the theoretical performance of the host vehicle A. Specifically, the historical statistics processing unit 27 makes the product of multiplying the power consumption per a predetermined unit of distance by the total length of the planned route the theoretical power consumption.

The operation then proceeds to step S412, and the historical statistics processing unit 27 extracts the position of a charging facility C that exists in the vicinity of the planned route that is searched for in the above-described step S401, based on the map information that is stored by the map information storage unit 25, after which the operation proceeds to step S413. The charging facility C that exists in the vicinity of the planned route may be a charging facility C that exists along the planned route, a charging facility C that is within a set distance (for example, 20 m) from the planned route, etc.

Next, in step S413, the historical statistics processing unit 27 executes a charging hub extraction operation based on the battery level acquired in the above-described step S402. In the charging hub extraction operation, the historical statistics processing unit 27 extracts the charging hubs that are transmitted (provided) to the source terminal device 2 from the charging hubs acquired in step S405, S409, or S412 described above. An example of a source terminal device 2 may be, for example, the terminal device 2 of the transmission source of the presentation route search request, which acted as a trigger to start this historical statistics processing step. Additionally, in the charging hub extraction operation, the possibility that the vehicle A cannot reach the destination point is determined; when a determination is made that there is a possibility that the vehicle cannot reach the destination, an unreachable warning, which gives a warning to that effect, is issued. The details of the charging hub extraction operation will be described below.

The operation then proceeds to step S414, and the historical statistics processing unit 27 executes a power consumption correction operation, based on the power consumption trends of the driver of the vehicle A. In the power consumption correction operation, the historical statistics processing unit 27 calculates the power that is consumed when driving along the presentation route (the similar route, the composite route) by referencing the first piece of driving history information for the driver that is specified by the driver ID, which includes the presentation route search request, from the first pieces of driving history information accumulated by the driving history accumulation unit 26. The historical statistics processing unit 27 then corrects the power consumption extracted in step S406, S410, or S411 described above, based on the calculated power consumption. The details of the power consumption correction operation will be described below.

The operation then proceeds to step S415, and the historical statistics processing unit 27 transmits (provides) to the source terminal device 2 the presentation route (the similar route, the composite route) extracted in step S403 or S407 described above, the charging hubs extracted in step S413 described above, and information regarding the power consumption that was corrected in step S414 described above, after which the driving history statistical processing step ends. If a presentation route could not be extracted in steps S403, S407 described above, the historical statistics processing unit 27 transmits information regarding the planned route searched for in the above-described step S401, the charging hubs extracted in the above-described step S413, and the power consumption (the theoretical power consumption) calculated in the above-described step S412. If an unreachable warning is issued in the above-described step S413, the historical statistics processing unit 27 also transmits (provides) a control command for displaying the unreachable warning to the source terminal device 2.

In the present embodiment, an example was described in which information regarding the charging hubs extracted in the above-described step S413 and the power consumption that is corrected in the above-described step S414 is transmitted (provided) to the source terminal device 2, but another configuration may also be employed. For example, the configuration may transmit (provide) information regarding the charging hubs acquired in step S405, S409, or S412 described above and the power consumption before correction in the above-described step S414 to the source terminal device 2.

Charging Hub Extraction Operation

Figure 10:
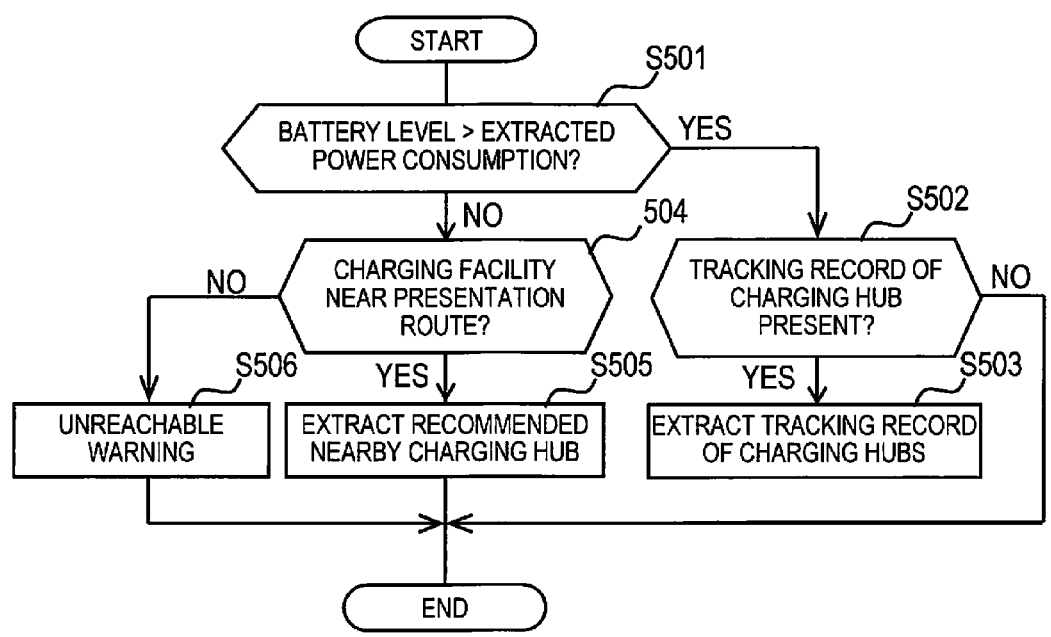
FIG. 10 is a flowchart representing the charging hub extraction operation.

Next, the charging hub extraction operation that is executed by the historical statistics processing unit 27 will be described. When the operation proceeds to step S413 in the above-described driving history statistical processing step, the historical statistics processing unit 27 executes a charging hub extraction operation. FIG. 10 is a flowchart representing the charging hub extraction operation.

First, in step S501, the historical statistics processing unit 27 determines whether or not the battery level acquired in the above-described step S402 is greater than the power consumption extracted in step S406, S410 or S411 described above (hereinafter also referred to as the extracted power consumption), as illustrated in FIG. 10. Then, if the historical statistics processing unit 27 determines that the battery level is greater than the extracted power consumption (step S501=Yes), the operation proceeds to step S502. On the other hand, if the historical statistics processing unit 27 determines that the battery level is equal to or less than the extracted power consumption (step S501=No), the operation proceeds to step S505.

When a determination is made that the battery level is greater than the extracted power consumption in step S501, the operation proceeds to step S502; in step S502, the historical statistics processing unit 27 determines whether or not there is a tracking record of a charging hub within the charging hubs acquired in step S405, S409, or S412 described above by referencing the second piece of driving history information (charging hubs) accumulated by the driving history accumulation unit 26. A tracking record of a charging hub may be a location of a charging facility C at which at least one of a plurality of vehicles A has actually performed charging. Then, if the historical statistics processing unit 27 determines that there is a tracking record of a charging hub (step S502=Yes), the operation proceeds to step S503. On the other hand, if the historical statistics processing unit 27 determines that there is no tracking record of a charging hub (step S502=No), a charging hub is not extracted, and the charging hub extraction operation ends. The historical statistics processing unit 27 thereby does not transmit (provide) information regarding tracking records of charging hubs to the source terminal device 2 when the battery level of the battery 14 for running the vehicle is sufficient and there is no tracking record of a charging hub among the charging hubs acquired in step S405, S409, or S412 described above. Since conceivably, a tracking record of a charging hub is a private-use charging facility of a particular individual or a corporation, preferentially extracting facilities that are without a doubt public charging facilities, as determined through statistical processing, is desirable. For example, a method in which the configuration has a separate database for public charging facilities and for those with a track record in the same locations from which these data are extracted may be conceived, or a method for extracting charging facilities that have a charging track record for which a plurality of vehicles (for example, equal to or greater than five) owned by different parties/entities (including corporations and individuals) have charged at the same location may be conceived. Additionally, making selections so that the charging facilities that can actually be utilized during the estimated arrival time zone at the hubs are preferentially traversed, is possible by giving consideration to the available time zones when utilizing these data.

On the other hand, when a determination is made that there is a tracking record of a charging hub, the operation proceeds to step S503; in step S503, the historical statistics processing unit 27 extracts the tracking records of charging hubs from the charging hubs acquired in step S405, S409, or S412 described above by referencing the second piece of driving history information (charging hubs) accumulated by the driving history accumulation unit 26, after which the charging hub extraction operation ends. The historical statistics processing unit 27 thereby only transmits (provides) to the source terminal device 2 information regarding the tracking records of charging hubs when the battery level of the battery 14 for running the vehicle is sufficient and there are tracking records of charging hubs among the charging hubs acquired in step S405, S409, or S412 described above.

When a determination is made that the battery level is equal to or less than the extracted power consumption in the above-described step S501, the operation proceeds to step S504; in step S504, the historical statistics processing unit 27 determines whether or not a charging facility C exists in the vicinity of the presentation route (the similar route, the composite route) determined in the step S403 or S407 described above, based on the map information stored by the map information storage unit 25. The charging facility C that exists in the vicinity of the presentation route may be a charging facility C that exists along the presentation route or a charging facility C that is within a set distance (for example, 20 m) from the presentation route, etc. If the historical statistics processing unit 27 determines that a charging facility C exists in the vicinity of the presentation route (step S504=Yes), the operation proceeds to step S505. On the other hand, if the historical statistics processing unit 27 determines that a charging facility C does not exist in the vicinity of the presentation route (step S504=No), the operation proceeds to step S506.

If a presentation route could not be determined in step S403 or S407 described above, the historical statistics processing unit 27 determines whether or not a charging facility C exists in the vicinity of the planned route searched for in the above-described step S401, based on the map information that is stored by the map information storage unit 25. If the historical statistics processing unit 27 determines that a charging facility C exists in the vicinity of the planned route (step S504=Yes), the operation proceeds to step S505. On the other hand, if the historical statistics processing unit 27 determines that a charging facility C does not exist in the vicinity of the planned route (step S504=No), the operation proceeds to step S506.

When a determination is made that a charging facility C exists in the vicinity of the presentation route in step S504, the operation proceeds to step S505; in step S505, the historical statistics processing unit 27 extracts the position of the charging facility C that exists in the vicinity of the presentation route (the similar route, the composite route) (hereinafter also referred to as the recommended nearby charging hub), based on the map information that is stored by the map information storage unit 25, after which the charging hub extraction operation ends. If a presentation route could not be extracted in steps S403 or S407 described above, the historical statistics processing unit 27 extracts the recommended nearby charging hubs that are present in the vicinity of the planned route, based on the map information that is stored by the map information storage unit 25. The historical statistics processing unit 27 thereby only transmits (provides) to the source terminal device 2 information regarding the recommended nearby charging hubs when the battery level of the battery 14 for running the vehicle is insufficient and there is a recommended nearby charging hub present.

On the other hand, when a determination is made that a charging facility C does not exist in the vicinity of the presentation route in step S504, the operation proceeds to step S506; in step S506, the historical statistics processing unit 27 issues an unreachable warning, after which the charging hub extraction operation ends. The historical statistics processing unit 27 thereby does not transmits (provide) to the source terminal device 2 information regarding the recommended nearby charging hubs (charging hubs) when the battery level of the battery 14 for running the vehicle is insufficient and a recommended nearby charging hub is not present.

Power Consumption Correction Operation

Figure 11:
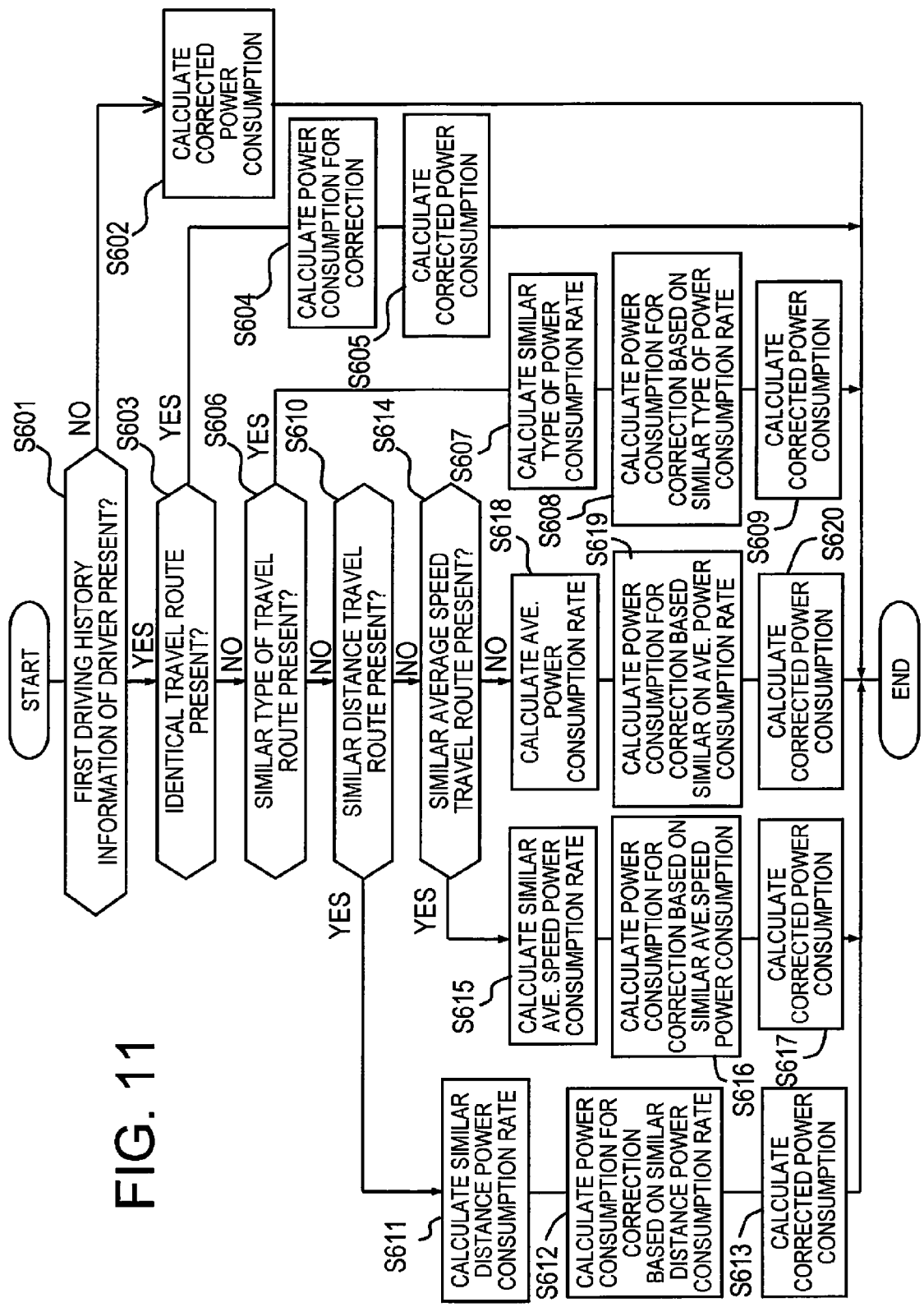
FIG. 11 is a flowchart representing the power consumption correction operation.

Next, the power consumption correction operation that is executed by the historical statistics processing unit 27 will be described. When the operation proceeds to step S414 in the above-described driving history statistical processing step, the historical statistics processing unit 27 executes a power consumption correction operation. FIG. 11 is a flowchart representing the power consumption correction operation.

First, in step S601, the historical statistics processing unit 27 acquires the driver ID (information for identifying the driver) from the received presentation route search request, as illustrated in FIG. 11. Next, the historical statistics processing unit 27 determines whether or not there is a first piece of driving history information that includes a driver ID that is identical to the acquired driver ID (hereinafter also referred to as the source driving history information) within the first piece of driving history information that is accumulated by the driving history accumulation unit 26. Then, if the historical statistics processing unit 27 determines that there is source driving history information (step S601=Yes), the operation proceeds to step S603. On the other hand, if the historical statistics processing unit 27 determines that there is no source driving history information (step S601=No), the operation proceeds to step S602.

When a determination is made that there is source driving history information in step S601, the operation proceeds to step S602; in step S602, the historical statistics processing unit 27 sets the power consumption calculated in step S406, S410, or S411 described above as the corrected power consumption as is (hereinafter also referred to as the corrected power consumption), and the power consumption correction operation ends. The historical statistics processing unit 27 thereby transmits (provides) to the source terminal device 2 information regarding the power consumption calculated in step S406, S410, or S411 described above as is when source driving history information does not exist within the first piece of driving history information that is accumulated by the driving history accumulation unit 26.

On the other hand, if a determination is made that source driving history information does not exist in step S601, the operation proceeds to step S603; in step S603, the historical statistics processing unit 27 determines whether or not there is a route that is identical to the similar route that is extracted in the above-described step S403 within the source driving history information (route) that is accumulated by the driving history accumulation unit 26 (hereinafter also referred to as the identical route). Then, if the historical statistics processing unit 27 determines that there is an identical route (step S603=Yes), the operation proceeds to step S604. On the other hand, if the historical statistics processing unit 27 determines that there is no identical route (step S603=No), the operation proceeds to step S606. An identical route may be any route that can be determined to be identical to the similar route that is extracted in the above-described step S403, and there may be discrepancies as long as they can be determined to be within the margin of error.

When a determination is made that there is an identical route in step S603, the operation proceeds to step S604; in step S604, the historical statistics processing unit 27 extracts the power that was consumed when driving the identical route from the source driving history information that is accumulated by the driving history accumulation unit 26. Next, the historical statistics processing unit 27 sets the extracted power consumption as the power consumption for correction.

The operation then proceeds to step S605, and the historical statistics processing unit 27 corrects the power consumption that is calculated in step S406, S410, or S411 described above, based on the power consumption for correction calculated in the above-described step S604. Examples of a method for correcting the power consumption include a method for replacing the power consumption with the power consumption for correction, a method for calculating the average value of the power consumption and the power consumption for correction, and a method for using the difference c between the power consumption b and the power consumption for correction a and expressing this as a±c. Next, the historical statistics processing unit 27 sets the power consumption that has been corrected as the corrected power consumption, after which the power consumption correction operation ends. The historical statistics processing unit 27 thereby makes a correction using the power that was consumed when driving along the identical route and transmits (provides) the corrected power consumption to the source terminal device 2 when there is an identical route within the source driving history information that is accumulated by the driving history accumulation unit 26.

On the other hand, when a determination is made that there is no identical route in step S603 described above, the operation proceeds to step S606; in step S606, the historical statistics processing unit 27 determines whether or not there is a similar type of route within the source driving history information (route) that is accumulated by the driving history accumulation unit 26. A similar type of route may be, for example, a route that has the identical or similar road type as the presentation route (the similar route, the composite route) that is extracted in steps S403 or S407 described above. If a presentation route could not be extracted in the steps S403, S407 described above, the planned route that is searched for in the above-described step S401 is set as a similar type of route. Then, if the historical statistics processing unit 27 determines that there is a similar type of route (step S606=Yes), the operation proceeds to step S607. On the other hand, if the historical statistics processing unit 27 determines that there is no similar type of route (step S606=No), the operation proceeds to step S610.

When a determination is made that there is a similar type of route in step S606, the operation proceeds to step S607; in step S607, the historical statistics processing unit 27 calculates the power consumption per unit of distance of the similar type of route (hereinafter also referred to as the similar type power consumption rate) by referencing the source driving history information that is accumulated by the driving history accumulation unit 26.

The operation then proceeds to step S608, and the historical statistics processing unit 27 multiplies the similar type power consumption rate calculated in the step S607 described above by the total length of the planned route. Then, the historical statistics processing unit 27 sets the product as the power consumption for correction.

The operation then proceeds to step S609, and the historical statistics processing unit 27 corrects the power consumption that is calculated in step S406, S410, or S411 described above, based on the power consumption for correction calculated in the above-described step S608. The method for correcting the power consumption may be the same method as that in the above-described step S605. Next, the historical statistics processing unit 27 sets the power consumption that has been corrected as the corrected power consumption, after which the power consumption correction operation ends. The historical statistics processing unit 27 thereby corrects the power consumption using the similar type power consumption rate and transmits (provides) the corrected power consumption to the source terminal device 2 when there is a similar type of route within the source driving history information that is accumulated by the driving history accumulation unit 26.

On the other hand, when a determination is made that there is no similar type of route in step S606 described above, the operation proceeds to step S610; in step S610, the historical statistics processing unit 27 determines whether or not there is a similar distance route within the source driving history information (route) that is accumulated by the driving history accumulation unit 26. A similar distance route may be, for example, a route that has an identical or similar total length as the presentation route (the similar route, the composite route) that is extracted in step S403 or S407 described above. If a presentation route could not be extracted in the steps S403, S407 described above, the planned route that is searched for in the above-described step S401 is set as a similar distance route. For example, the historical statistics processing unit 27 determines whether or not there is a route with a difference in the total length, when compared to the presentation route, that is less than a predetermined value (for example, ±100 m) within the source driving history information (route) that is accumulated by the driving history accumulation unit 26. Then, if the historical statistics processing unit 27 determines that there is a similar distance route (step S610=Yes), the operation proceeds to step S611. On the other hand, if the historical statistics processing unit 27 determines that there is no similar distance route (step S610=No), the operation proceeds to step S614.

When a determination is made that there is a similar distance route in step S610, the operation proceeds to step S611; in step S611, the historical statistics processing unit 27 calculates the power consumption per unit of distance of the similar distance route (hereinafter also referred to as the similar distance power consumption rate) by referencing the source driving history information that is accumulated by the driving history accumulation unit 26.

The operation then proceeds to step S612, and the historical statistics processing unit 27 multiplies the similar distance power consumption rate calculated in the step S611 described above by the total length of the planned route. Then, the historical statistics processing unit 27 sets the product as the power consumption for correction.

The operation then proceeds to step S613, and the historical statistics processing unit 27 corrects the power consumption that is calculated in step S406, S410, or S411 described above, based on the power consumption for correction calculated in the above-described step S612. The method for correcting the power consumption may be the same method as that in the above-described step S605. Next, the historical statistics processing unit 27 sets the power consumption that has been corrected as the corrected power consumption, after which the power consumption correction operation ends. The historical statistics processing unit 27 thereby corrects the power consumption using the similar distance power consumption rate and transmits (provides) the corrected power consumption to the source terminal device 2 when there is a similar distance route within the source driving history information that is accumulated by the driving history accumulation unit 26.

On the other hand, when a determination is made that there is no similar distance route in step S610 described above, the operation proceeds to step S614; in step S614, the historical statistics processing unit 27 determines whether or not there is a similar average speed route within the source driving history information (route) that is accumulated by the driving history accumulation unit 26. A similar average speed route may be, for example, a route that has an identical or similar average speed as the presentation route (the similar route, the composite route) that is extracted in step S403 or S407 described above. If a presentation route could not be extracted in the steps S403, S407 described above, the planned route that is searched for in the above-described step S401 is set as a similar average speed route. For example, the historical statistics processing unit 27 determines whether or not there is a route with a difference in the average speed, when compared to the presentation route, that is less than a predetermined value (for example, ±5 km/h) within the source driving history information (route) that is accumulated by the driving history accumulation unit 26. Then, if the historical statistics processing unit 27 determines that there is a similar average speed route (step S614=Yes), the operation proceeds to step S615. On the other hand, if the historical statistics processing unit 27 determines that there is no similar average speed route (step S614=No), the operation proceeds to step S618.

When a determination is made that there is a similar average speed route in step S614, the operation proceeds to step S615; in step S615, the historical statistics processing unit 27 calculates the power consumption per unit of distance of the similar average speed route (hereinafter also referred to as the similar average speed power consumption rate) by referencing the source driving history information that is accumulated by the driving history accumulation unit 26.

The operation then proceeds to step S616, and the historical statistics processing unit 27 multiplies the similar average speed power consumption rate calculated in the step S615 described above by the total length of the planned route. Then, the historical statistics processing unit 27 sets the product as the power consumption for correction.

The operation then proceeds to step S617, and the historical statistics processing unit 27 corrects the power consumption that is calculated in step S406, S410, or S411 described above, based on the power consumption for correction calculated in the above-described step S616. The method for correcting the power consumption may be the same method as that in the above-described step S605. Next, the historical statistics processing unit 27 sets the power consumption that has been corrected as the corrected power consumption, after which the power consumption correction operation ends. The historical statistics processing unit 27 thereby corrects the power consumption using the similar average vehicle speed power consumption rate and transmits (provides) the corrected power consumption to the source terminal device 2 when there is a similar average speed route within the source driving history information that is accumulated by the driving history accumulation unit 26.

On the other hand, when a determination is made that there is no similar average speed route in step S614, the operation proceeds to step S618; in step S618, the historical statistics processing unit 27 calculates the average value of the power consumption per unit of distance for all of the routes of the source driving history information (hereinafter also referred to as the average power consumption rate) by referencing the source driving history information that is accumulated by the driving history accumulation unit 26.

The operation then proceeds to step S619, and the historical statistics processing unit 27 multiplies the average power consumption rate calculated in the step S618 described above by the total length of the planned route. Then, the historical statistics processing unit 27 sets the product as the power consumption for correction.

The operation then proceeds to step S620, and the historical statistics processing unit 27 corrects the power consumption that is calculated in steps S406, S410, or S411 described above, based on the power consumption for correction calculated in the above-described step S619. The method for correcting the power consumption may be the same method as that in the above-described step S605. Next, the historical statistics processing unit 27 sets the power consumption that has been corrected as the corrected power consumption, after which the power consumption correction operation ends. The historical statistics processing unit 27 thereby corrects the power consumption using the average power consumption rate and transmits (provides) the corrected power consumption to the source terminal device 2 when all of the determinations of the steps S603, S606, S610, and S614 described above are "NO."

In this way, in the present embodiment, the historical statistics processing unit 27 calculates the power that is consumed when driving along the searched planned route, based on the first piece of driving history information for a specified driver, from among the first piece of driving history information that is accumulated by the driving history accumulation unit 26. The historical statistics processing unit 27 then corrects the extracted power consumption, based on the calculated power consumption. Next, the historical statistics processing unit 27 provides information regarding the corrected power consumption. For this reason, acquiring power consumption information that takes into consideration the driving characteristics of the driver is possible. For this reason, providing more appropriate power consumption information is possible.

As described above, in the present embodiment, an vehicle information providing device 3 sequentially acquires at least one of driving location information, power consumption information and charging location information from a vehicle-mounted device 1 installed in a vehicle A with an electric motor 13 as a drive source at least the driving location information, the power consumption information, or the charging location information and accumulates this as the driving history information (the first piece of driving history information, the second piece of driving history information). The vehicle information providing device 3 then refers to the accumulated first piece of driving history information, searches for a similar route that is either identical or similar to a planned route, and sets the detected similar route as a presentation route. Alternatively, a composite route is set as the presentation route instead of the similar route. The vehicle information providing device 3 then refers to the accumulated first piece of driving history information and second piece of driving history information and detects the power that is consumed when driving the set presentation route and the charging hubs that will be traversed when driving along the presentation route. The vehicle information providing device 3 provides the information regarding the set presentation route, as well as the determined power consumption and charging hubs. Accordingly, providing power consumption information and charging hub information that are more in accordance with the actual environment is possible.

In the present embodiment, an example was described in which the vehicle information providing device 3 determines (extracts) both the power that was consumed when a vehicle A actually drove a similar route, as well as the charging hubs, but another configuration may also be used. For example, the vehicle information providing device 3 may be configured to determine at least either the power consumption or the charging hubs. In this case, the vehicle information providing device 3 provides (transmits) only the power consumption or the charging hub that has been determined along with the presentation route.

According to the present embodiment, an vehicle information providing device 3 sequentially acquires at least one of driving location information, power consumption information and charging location information from a vehicle-mounted device 1 installed in a vehicle A with an electric motor 13 as a drive source and accumulates this as driving history information (the first piece of driving history information, the second piece of driving history information). The vehicle information providing device 3 then refers to the accumulated first piece of driving history information and searches for a similar route that is either identical or similar to a planned route from the departure point $P_O$ to a destination point $P_D$. The vehicle information providing device 3 then refers to the accumulated first piece of driving history information and second piece of driving history information and detects the power that is consumed when driving the set presentation route and the charging hubs that will be traversed when driving along the presentation route. Next, the vehicle information providing device 3 provides the information regarding the determined presentation route, as well as at least either the determined power consumption or the charging hubs. According to the present embodiment, the power that is consumed when a vehicle A travels and the charging hubs are determined with reference to the driving history information, that is, information that is acquired while the vehicle A actually travels; as a result, providing information regarding the power consumption according to the actual environment and information regarding the charging hubs is possible according to the present invention.

According to the present embodiment, when searching for a similar route, a circular range having a radius $r_O$ from the departure point $P_O$ is set as the departure point range $R_O$; a circular range having a radius $r_D$ from the destination point is set as the destination point range $R_D$; a route having a travel start point and a travel end point within the set departure point range $R_O$ and destination point range $R_D$ is searched for; and the searched route is detected as a similar route. Consequently, according to the present embodiment, avoiding situations in which a corresponding similar route is not present in the first piece of driving history information (route) that is accumulated by the history information accumulation unit 26 is possible; as a result, appropriately setting a similar route thereby becomes possible.

A second embodiment of the present invention will be explained next. In a vehicle information provision system S illustrated in FIG. 1, besides the method for setting the departure point range $R_O$ and the destination point range $R_D$ when searching for a similar route being different from the first embodiment in the points explained below, the second embodiment comprises the same configuration and exerts the same effects as those of the first embodiment described above. Here, FIG. 12 is a view illustrating a departure point range $R_O$ and destination point range $R_D$ that are set in the second embodiment.

Figure 12:
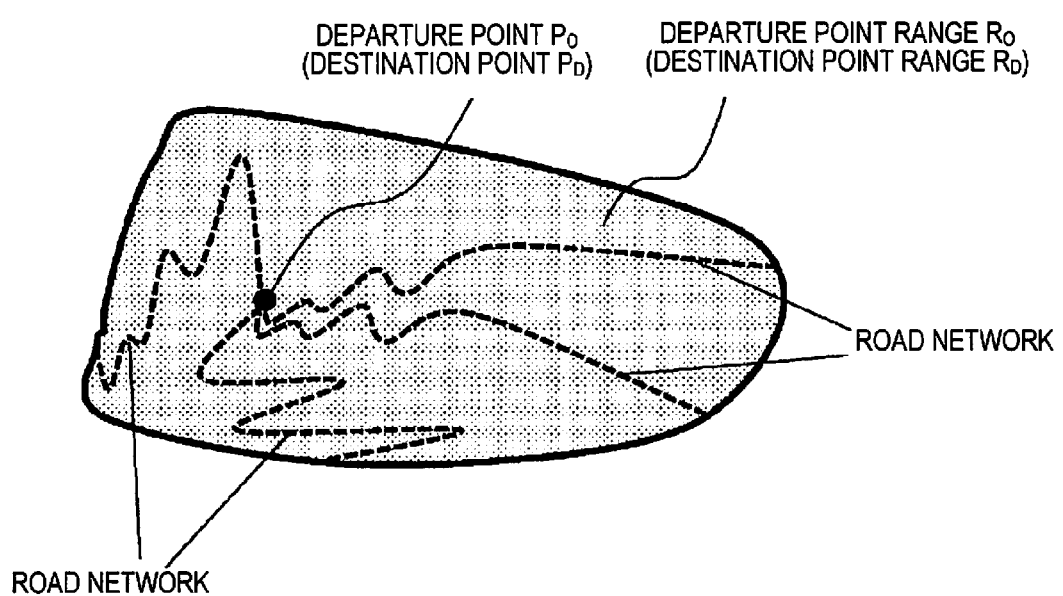
FIG. 12 is a view illustrating a departure point range $R_O$ and destination point range $R_D$ set in the second embodiment.

That is, in the second embodiment, when setting a departure point range $R_O$, the historical statistics processing unit 27 sets a range in which the path on the road network that starts at the departure point $P_O$ becomes a predetermined equal distance (for example, 5 km) as the departure point range $R_O$, as illustrated in FIG. 12. Also, when setting the destination point range $R_D$, a range in which the path on the road network that starts at the destination point $P_D$ becomes a predetermined equal distance (for example, 5 km) is set as the destination point range $R_D$, in the same way as with the departure point range $R_O$. Then, in the second embodiment, from the first piece of driving history information (route) accumulated by the driving history accumulation unit 26, the historical statistics processing unit 27 searches for a route that has a travel start point and a travel end point within the set departure point range $R_O$ and the destination point range $R_D$ and detects the searched route as a similar route using the departure point range $R_O$ and the destination point range $R_D$ that are set in this way.

In the second embodiment, an example of a method for setting the departure point range $R_O$ and the destination point range $R_D$ may be a method in which the map information that is stored in the map information storage unit 25 is referenced; each point at which the path will become a predetermined equal distance on a road network that starts at the departure point $P_O$ and the destination point $P_D$ as an equal path point is detected; and the ranges that are obtained by connecting each of the detected equal path points are set as the departure point range $R_O$ and the destination point range $R_D$. Additionally, in the second embodiment as well, a determination may be made regarding whether or not a point corresponds to a toll road or a facility attached to a toll road; according to the determination results, an operation may be performed to remove the area of or to remove areas besides the toll road or the facility that is attached to the toll road from the departure point range $R_O$ and the destination point range $R_D$ in the same way as in the first embodiment.

According to the second embodiment, achieving the following effects in addition to the effects of the first embodiment is possible. That is, since the second embodiment sets the departure point range $R_O$ and the destination point range $R_D$ based on the actual path, appropriately detecting a similar route that is closer to the actual travel conditions is possible. Accordingly, providing power consumption information and charging hub information that are more in accordance with the actual environment is possible.

A third embodiment of the present invention will be explained next. In a vehicle information provision system S illustrated in FIG. 1, besides the method for setting the departure point range $R_O$ and the destination point range $R_D$ when searching for a similar route being different from the first embodiment in the points explained below, the third embodiment comprises the same configuration and exerts the same effects as those of the first embodiment described above. Here, FIG. 13 is a view illustrating a departure point range $R_O$ and destination point range $R_D$ that are set in the third embodiment.

Figure 13:
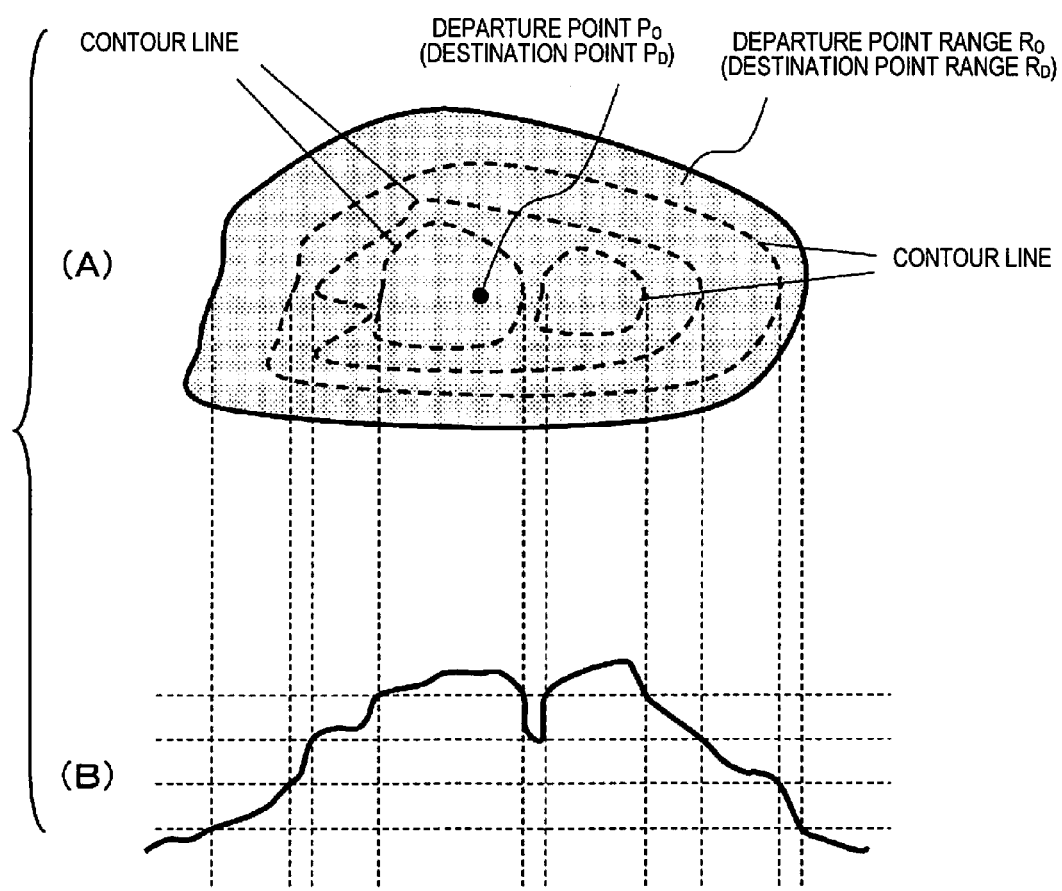
FIG. 13 is a view illustrating a departure point range $R_O$ and destination point range $R_D$ set in the third embodiment.

That is, in the third embodiment, when setting a departure point range $R_O$, the historical statistics processing unit 27 sets a range that is within a predetermined distance range from the departure point $P_O$ and that is within a predetermined altitude range in relation to the altitude of the departure point $P_O$ as the departure point range $R_O$, as illustrated in part (A) of FIG. 13. Also, when setting the destination point range $R_D$, a range that is within a predetermined distance range from the destination point $P_D$ and that is within a predetermined altitude range in relation to the altitude of the destination point $P_D$ is set as the destination point range $R_D$ in the same way as with the departure point range $R_O$. Then, in the third embodiment, from the first piece of driving history information (route) accumulated by the driving history accumulation unit 26, the historical statistics processing unit 27 searches for a route that has a travel start point and a travel end point within the set departure point range $R_O$ and the destination point range $R_D$ and detects the searched route as a similar route using the departure point range $R_O$ and the destination point range $R_D$ that are set in this way. part (A) of FIG. 13 is a view illustrating a departure point range $R_O$ and destination point range $R_D$ that are set in the third embodiment, and part (B) of FIG. 13 illustrates the actual altitude in part (A) of FIG. 13.

In the third embodiment, an example of a method for setting the departure point range $R_O$ and the destination point range $R_D$ may be a method in which the map information that is stored in the map information storage unit 25 is referenced and the departure point range $R_O$ and the destination point range $R_D$ are set based on the altitude information that is included in the map information. Additionally, in the third embodiment as well, a determination may be made regarding whether or not a point corresponds to a toll road or a facility attached to a toll road; according to the determination results, an operation may be performed to remove the area of or to remove areas besides the toll road or the facility that is attached to the toll road from the departure point range $R_O$ and the destination point range $R_D$ in the same way as in the first embodiment.

According to the third embodiment, achieving the following effects in addition to the effects of the first embodiment is possible. That is, according to the third embodiment, by setting ranges that are within a predetermined altitude range in relation to the altitudes of the departure point $P_O$ and the destination point $P_D$ as the departure point range $R_O$ and the destination point range $R_D$, appropriately detecting a similar route that is closer to the actual travel conditions is possible. Accordingly, providing power consumption information and charging hub information that are more in accordance with the actual environment is possible. In particular, in a vehicle with an electric motor 13 as a drive source, since there are cases in which the power consumption will greatly change when the altitude is different, according to the third embodiment, detecting a similar route that takes into consideration this type of characteristic becomes possible.

A fourth embodiment of the present invention will be explained next. In a vehicle information provision system S illustrated in FIG. 1, besides the method for setting the departure point range $R_O$ and the destination point range $R_D$ when searching for a similar route being different from the first embodiment in the points explained below, the fourth embodiment comprises the same configuration and exerts the same effects as that of the first embodiment described above. Here, FIG. 14 is a view illustrating a departure point range $R_O$ and destination point range $R_D$ that are set in the fourth embodiment.

Figure 14:
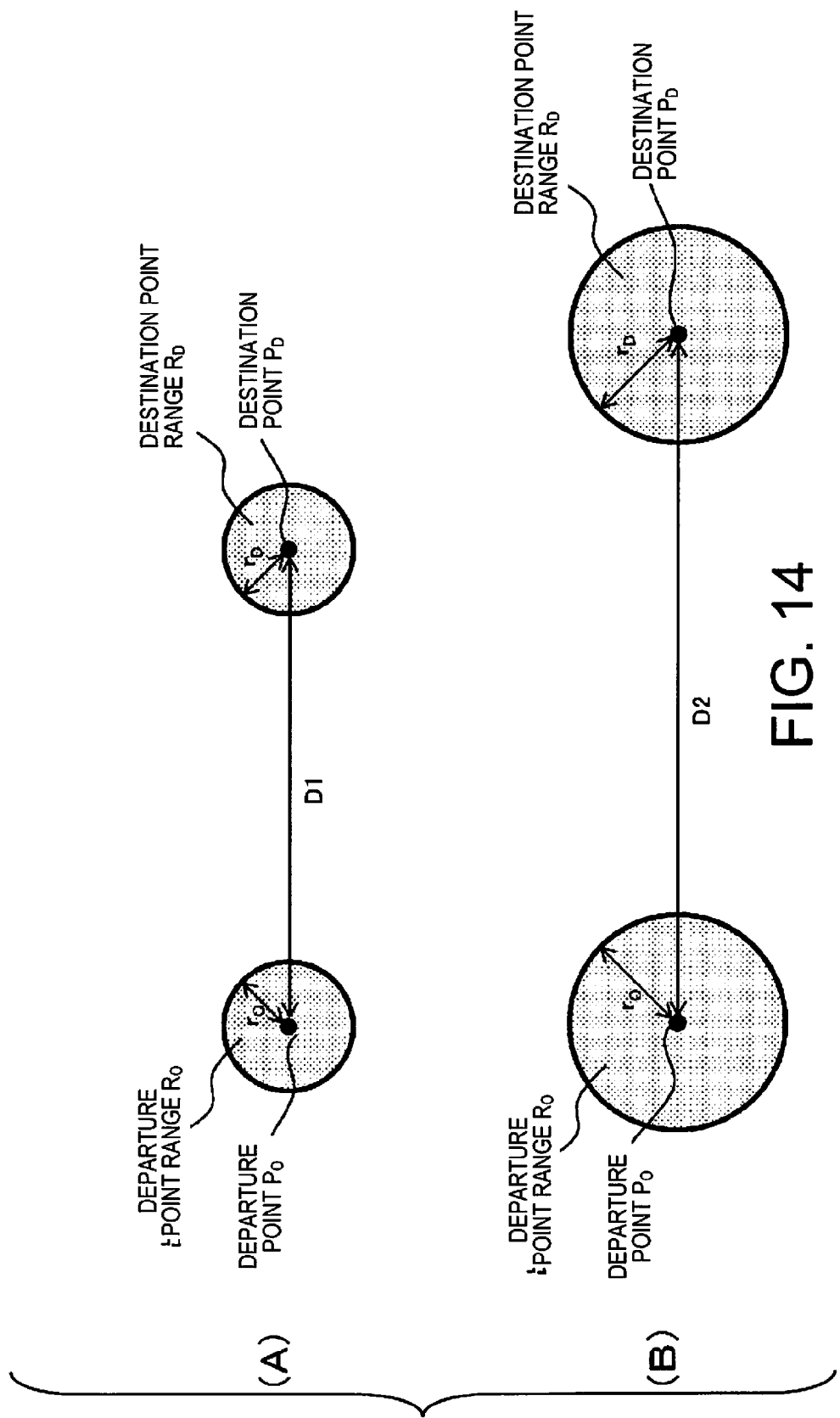
FIG. 14 is a view illustrating a departure point range $R_O$ and destination point range $R_D$ set in the fourth embodiment.

That is, instead of a configuration in which a predetermined distance is set as the radius $r_O$ and radius $r_D$, which define the magnitude (size) of the departure point range $R_O$ and the destination point range RD, the fourth embodiment is configured so that the radius $r_O$ and radius $r_D$ are changed according to the distance between the departure point $P_O$ and the destination point $P_D$, as illustrated in part (A) of FIG. 14, part (B) of FIG. 14. That is, when the distance D1 (D1<D2) between the departure point $P_O$ and the destination point $P_D$ is relatively short, the radius $r_O$ and radius $r_D$ are set to have relatively small values; while when the distance D2 between the departure point $P_O$ and the destination point $P_D$ is relatively long, the radius $r_O$ and radius $r_D$ are set to have relatively large values, as illustrated in part (A) of FIG. 14, part (B) of FIG. 14.

According to the fourth embodiment, achieving the following effects in addition to the effects of the first embodiment is possible. That is, according to the fourth embodiment, since the radius $r_O$ and radius $r_D$, which define the magnitude (size) of the departure point range $R_O$ and the destination point range $R_D$, are changed according to the distance between the departure point $P_O$ and the destination point $P_D$, more appropriately detecting a similar route is possible. In particular, as illustrated in part (B) of FIG. 14, when the distance D2 between the departure point $P_O$ and the destination point $P_D$ is relatively long, the effects of expanding the departure point range $R_O$ and the destination point range $R_D$ are relatively small (the sizes of the departure point range $R_O$ and the destination point range $R_D$ in relation to the total travel distance is small); as a result, in such a case, increasing the number of detectable similar routes is possible by relatively expanding the departure point range $R_O$ and the destination point range $R_D$. On the other hand, as illustrated in part (A) of FIG. 14, when the distance D1 between the departure point $P_O$ and the destination point $P_D$ is relatively short, maintaining the accuracy of the detected similar route (the degree of similarity of the various parameters, such as the power consumption) is possible by narrowing the departure point range $R_O$ and the destination point range $R_D$.

Additionally, in the fourth embodiment as well, a determination may be made whether or not a point corresponds to a toll road or a facility attached to a toll road; according to the determination results, an operation may be performed to remove the area of or to remove the areas besides the toll road or the facility that is attached to the toll road from the departure point range $R_O$ and the destination point range $R_D$, in the same way as in the first embodiment.

Additionally, in FIG. 14, an example was shown where, in an example in which the departure point range $R_O$ and the destination point range $R_D$ are made to have a predetermined circular shape, the radius $r_O$ and radius $r_D$ are changed according to the distance between the departure point $P_O$ and the destination point $P_D$; however, the configuration may also be such that the departure point range $R_O$ and the destination point range $R_D$ are set so that the path on a road network will be a predetermined equal distance and so that this predetermined equal distance will be changed according to the distance between the departure point $P_O$ and the destination point $P_D$, in the same way as in the second embodiment (refer to FIG. 12) That is, the predetermined equal distance is set to be longer as the distance between the departure point $P_O$ and the destination point $P_D$ increases, and the predetermined equal distance can be set to be shorter as the distance between the departure point $P_O$ and the destination point $P_D$ decreases.

Alternatively, in the same way as in the third embodiment (refer to FIG. 13), the configuration may be such that the ranges that are within a predetermined altitude range in relation to the altitudes of the departure point $P_O$ and the destination point $P_D$ may be set as the departure point range $R_O$ and the destination point range $R_D$ and so that this type of predetermined altitude range is changed according to the distance between the departure point $P_O$ and the destination point $P_D$. That is, the predetermined altitude range is set to be larger as the distance between the departure point $P_O$ and the destination point $P_D$ increases, and the predetermined altitude range can be set to be smaller as the distance between the departure point $P_O$ and the destination point $P_D$ decreases.

Additionally, in the fourth embodiment, an example was shown in which the sizes of the departure point range $R_O$ and the destination point range $R_D$ are changed according to the distance between the departure point $P_O$ and the destination point $P_D$; however, the configuration may be such that, for example, from the first piece of driving history information (route), the size (extent) of the departure point range $R_O$ is changed according to the amount of data having a travel start point within the vicinity of the departure point $P_O$. That is, the departure point range $R_O$ is set to be smaller (narrower) as the amount of data having travel start points within the vicinity of the departure point $P_O$ increases, and the departure point range $R_O$ is set to be larger (wider) as the amount of data having travel start points within the vicinity of the departure point $P_O$ decreases. Additionally, regarding the destination point range $R_D$, the configuration may be such that the size (extent) of the destination point range $R_D$ is changed according to the amount of data having travel end points within the vicinity of the destination point $P_D$ in the same way as with the departure point range $R_O$.

In particular, detecting a predetermined number of similar routes is possible by changing the size (extent) of the departure point range $R_O$ and the destination point range $R_D$ according to the amount of data having travel start points within the vicinity of the departure point $P_O$ and the number of data having travel end points within the vicinity of the destination point $P_D$; as a result, securing a certain number of presentation routes to present to the driver thereby becomes possible, and appropriately providing useful information to the driver is possible.

Additionally, in the fourth embodiment described above, an example was explained in which the size of the departure point range $R_O$ and the destination point range $R_D$ are changed according to the distance between the departure point $P_O$ and the destination point $P_D$; however, using a configuration in which the size of the departure point range $R_O$ and the destination point range $R_D$ are changed according to the time required to reach the destination point $P_D$ from the departure point $P_O$ (the travel time) is also possible.

Embodiments of the present invention were described above, but these embodiments have been described in order to facilitate an understanding of the present invention; they have not been described in order to limit the present invention. Therefore, the elements disclosed in the embodiments above are intended to include all design modifications and equivalents thereto that lie within the technical range of the present invention.

Figure 15:
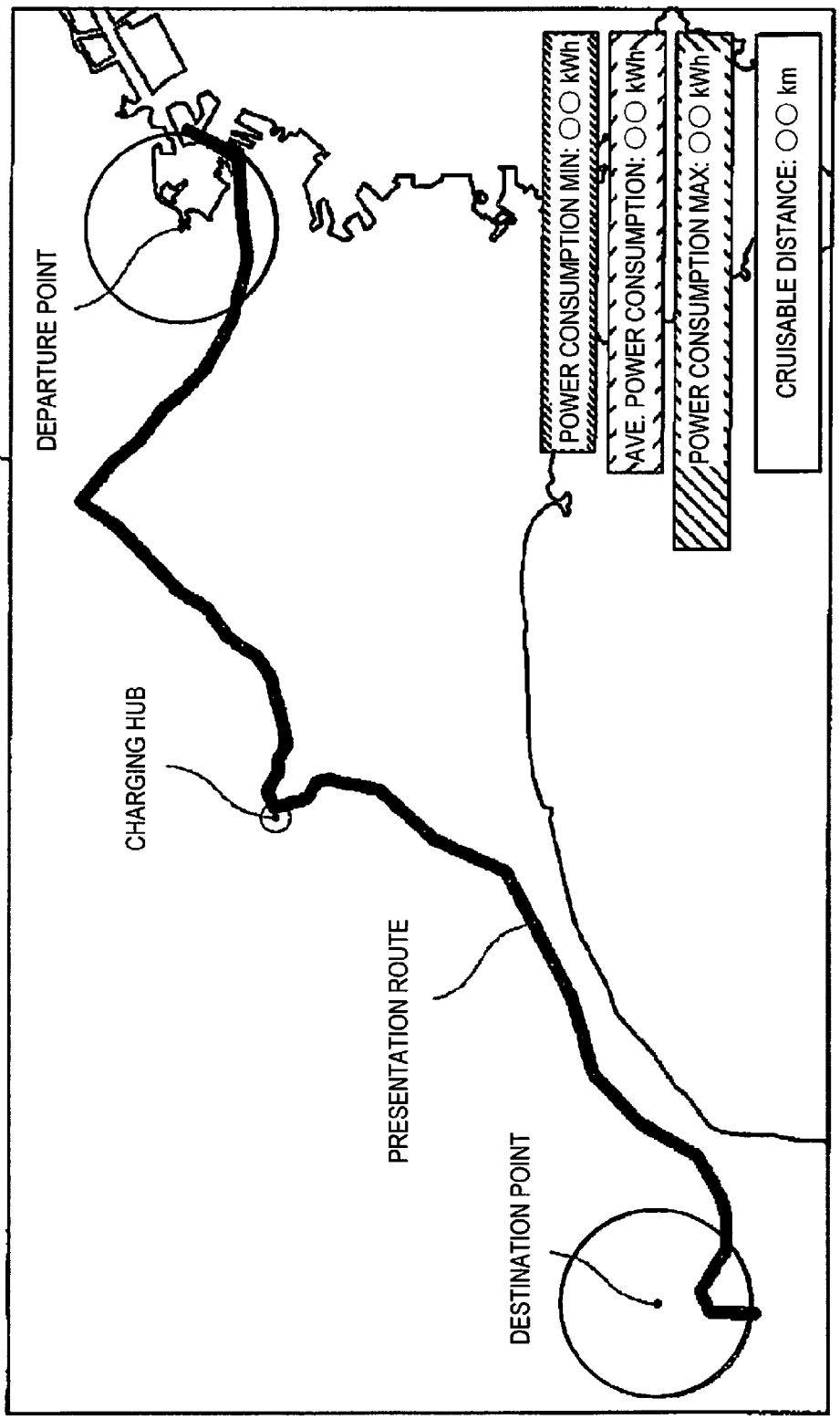
FIG. 15 is a view illustrating another example of the contents displayed by a display unit 24.

For example, in the above-described embodiment, the historical statistics processing unit 27 may be configured to refer to the first piece of driving history information that is accumulated by the driving history accumulation unit 26 in order to determine the power consumption when driving along the presentation route (the similar route, the composite route) for each driver. In this case, the historical statistics processing unit 27 transmits (provides) to the source terminal device 2 information regarding the maximum power consumption, the minimum power consumption, and the average power consumption from the determined power consumption for each driver, along with information regarding the presentation route and the charging hubs. The source terminal device 2 thereby displays on the display screen the maximum power consumption (power consumption MAX), the minimum power consumption (power consumption MIN), and the average power consumption (average power consumption), along with the presentation route and the charging hubs, based on the received information, as illustrated in FIG. 15. In particular, according to this type of configuration, the power consumption when driving along the presentation route is calculated for each driver, and the maximum power consumption, the minimum power consumption, and the average power consumption of the calculated power consumption are provided. Accordingly, the user can obtain the degree of variation in the power consumption for each driver.

Figure 16:
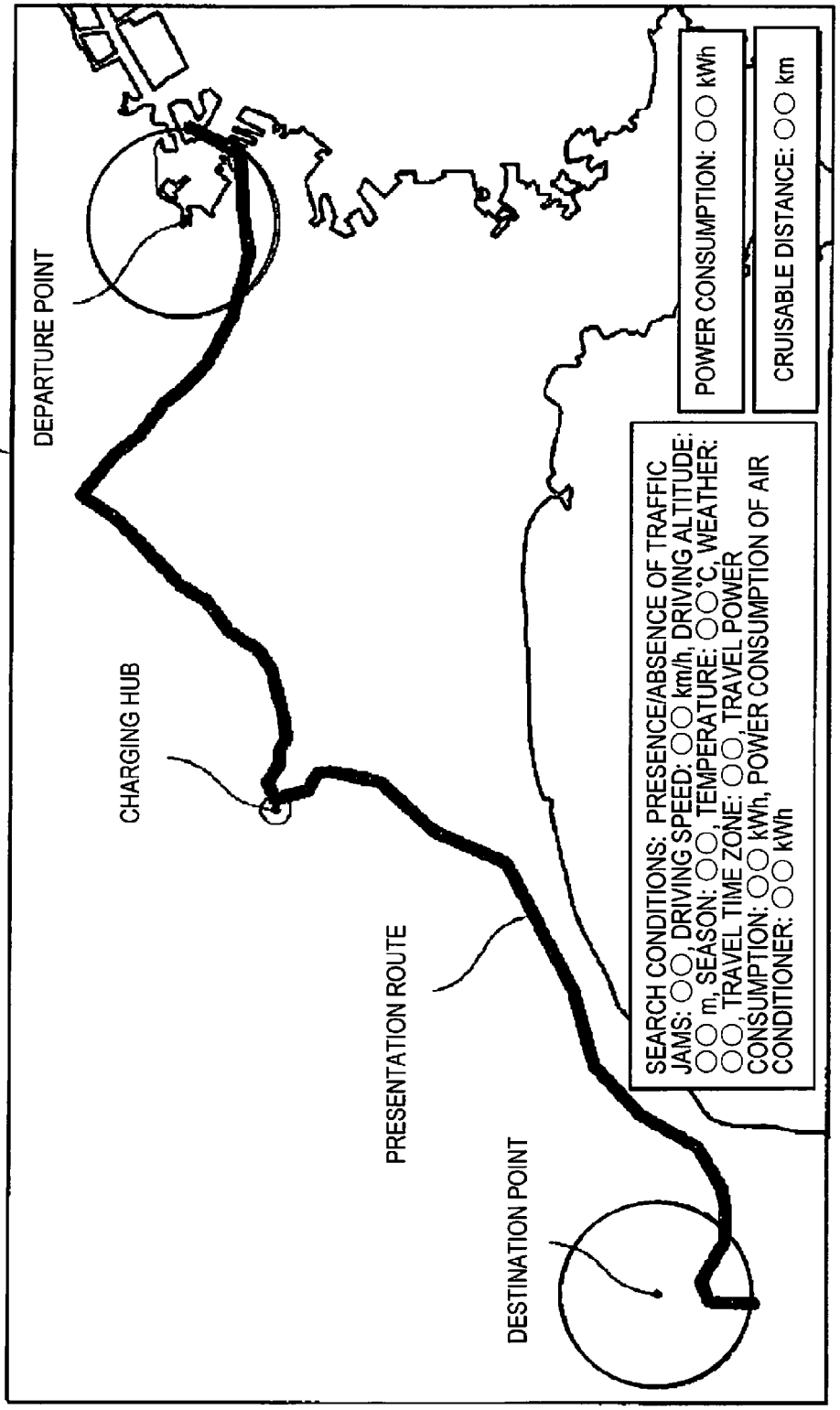
FIG. 16 is a view illustrating another example of the contents displayed by a display unit 24.

Additionally, in the embodiment described above, an example was explained in which the display unit 24 displays the power consumption and the charging hubs along with the presentation route (the similar route, the composite route), but another configuration may also be used. For example, the display unit 24 may be configured to display information regarding the presence/absence of traffic jams, the driving speed, the driving altitude, the season, the temperature, the weather, the travel time zone, the travel power consumption, and the power consumption by the air conditioner, which are included in the first piece of driving history information and the second piece of driving history information, used for the extraction of the power consumption and charging hubs. Specifically, the terminal device 2 receives an input of at least either the presence/absence of traffic jams, the driving speed, the driving altitude, the season, the temperature, the weather, the travel time zone, the travel power consumption, and the power consumption by the air conditioner (hereinafter also referred to as the state quantity for search). Next, the terminal device 2 transmits the received information regarding the state quantity for search to the vehicle information providing device 3. Subsequently, when information that has been transmitted by the terminal device 2 is received, the vehicle information providing device 3 (state quantity for search historical statistics processing unit 27) acquires the search condition state quantity from the received information as the search condition. The historical statistics processing unit 27 then determines the power that has been consumed when driving the selected presentation route, as well as the charging hubs that will be traversed when driving along the presentation route, by referencing the driving history information conforming to the acquired search condition, from among the driving history information that is accumulated by the driving history accumulation unit 26. Then, the historical statistics processing unit 27 transmits (provides) the acquired search condition information to the source terminal device 2, along with information regarding the presentation route (the similar route, the composite route), the power consumption, and the charging hubs. The source terminal device 2 thereby displays on the display screen the search conditions used for determining the power consumption and the charging hubs, in addition to the presentation route, the power consumption, and the charging hubs, based on the received information, as illustrated in FIG. 16. According to this kind of configuration, the search conditions used for determining the power consumption and the charging hubs are provided along with the presentation route, the power consumption, and the charging hubs. Accordingly, the user can obtain the search conditions used for determining the power consumption and charging hubs.

Additionally, the first to the fourth embodiments described above may be appropriately combined; for example, the departure point range $R_O$ may be set in a range in which the path on the road network will become a predetermined equal distance (refer to FIG. 12), as in the second embodiment, and the destination point range $R_D$ may be set in a range that will be a predetermined altitude range (refer to FIG. 13) in relation to the altitude of the destination point $P_D$, as in the third embodiment. Also, for example, the configuration may be such that the historical statistics processing unit 27 changes the method for setting the departure point range $R_O$ and the destination point range $R_D$ depending on the geographical conditions, etc., of the departure point $P_O$ and the destination point $P_D$. That is, for example, the configuration may be such that, when the departure point $P_O$ and the destination point $P_D$ are set to locations where there are few road networks, the departure point range $R_O$ and the destination point range $R_D$ are set within ranges in which the path on the road network will become a predetermined equal distance (refer to FIG. 12), as in the second embodiment; when the departure point $P_O$ and the destination point $P_D$ are set in locations with large undulations, the departure point range $R_O$ and the destination point range $R_D$ are set within ranges that are within a predetermined altitude range in relation to the altitudes of the departure point $P_O$ and the destination point $P_D$ (refer to FIG. 13).

Furthermore, when the departure point $P_O$ and the destination point $P_D$ are determined to be within the premises of a specific facility (for example, when these points have been determined to be within the range of a facility polygon representing a specific facility), the premises of the specific facility may be set to the departure point range $R_O$ and the destination point range $R_D$. In particular, when the departure point $P_O$ and the destination point $P_D$ are set by the driver, there are cases in which the above is performed by inputting the name of a specific facility, and increasing the detection accuracy of a similar route becomes possible by setting the premises of the specific facility to the departure point range $R_O$ or the destination point range $R_D$.

The methods for setting the departure point range $R_O$ and the destination point range $R_D$ are not limited to those described above; for example a rectangular range configured from ±d1 latitude and ±d2 longitude about the departure point $P_O$ and the destination point $P_D$ may be set as the departure point range $R_O$ and the destination point range $R_D$. Alternatively, a grid that is made by delimiting the latitude and longitude on a map per a predetermined step can be set, and a predetermined number of grid ranges around the departure point $P_O$ and the destination point $P_D$ may be set as the departure point range $R_O$ and the destination point range $R_D$.

In the above-described embodiment, the driving history accumulation unit 26 of the vehicle information providing device 3 corresponds to the history information accumulation unit of the present invention; the historical statistics processing unit 27 of the vehicle information providing device 3 corresponds to the input unit, the setting unit, the presentation route determination unit, the presentation information determination unit, and the presentation information provision unit of the present invention.

The invention claimed is:

1. A vehicle information providing device comprising:
a history information accumulation unit that acquires driving location information and at least one of power consumption information and charging location information from vehicle-mounted devices installed on a plurality of vehicles that each have an electric motor as a drive source, the history information accumulation unit accumulating the acquired information as driving history information, the driving location information including information regarding routes driven by the plurality of vehicles, the power consumption information including information regarding power consumed by the vehicles when driving the respective routes, and the charging location information including information regarding charging facilities traversed when driving the respective routes;
an input unit for inputting a departure point and a destination point for searching for a route;
a range setting unit that sets a departure point range and a destination point range, the departure point range being a prescribed geographic area including the departure point, and the destination point range being a prescribed geographic area including the destination point, a size of the departure point range and a size of the destination point range being variably set based on the departure point and the destination point inputted via the input unit;
a presentation route determination unit that accesses the driving history information accumulated by the history information accumulation unit and searches for at least one route that was driven from a point within the departure point range to a point within the destination point range by at least one vehicle among the plurality of vehicles, and determines the searched at least one route as at least one presentation route;
a presentation information determination unit that determines at least one of a power that will be consumed when driving the at least one presentation route and charging facilities that will be traversed when driving the at least one presentation route by referencing the driving history information accumulated in the history information accumulation unit; and
a presentation information provision unit that provides information regarding the at least one presentation route determined by the presentation route determination unit, the provided information including the at least one of the power consumption and the charging facilities determined by the presentation information determination unit.

2. The vehicle information providing device as recited in claim 1, wherein
the range setting unit sets at least one of the departure point range and the destination point range as a circular range having a predetermined radius around the departure point or the destination point.

3. The vehicle information providing device as recited in claim 1, wherein
the setting unit sets at least one of the departure point range and the destination point range as a range in which distances along each path among a plurality of paths following a plurality of different roads that start at the departure point or the destination point and end at a perimeter of the range will be a predetermined equal distance.

4. The vehicle information providing device as recited in claim 1, wherein the range setting unit sets at least one of the departure point range and the destination point range to be defined by points that are within a predetermined distance range from the departure point or the destination point and within a predetermined altitude range in relation to the altitude of the departure point or the destination point.

5. The vehicle information providing device as recited in claim 1, wherein
when one of the departure point and the destination point input by the input unit is a specific facility, the range setting unit sets at least one of the departure point range and the destination point range as a range of the facility.

6. The vehicle information providing device as recited in claim 1, wherein
the range setting unit is configured such that
when at least one of the departure point and the destination point input by the input unit corresponds to a toll road or a facility attached to a toll road, the range setting unit sets a range that includes only ranges of toll roads and facilities attached to toll roads as the at least one of the departure point range and the destination point range, and
when one of the departure point and the destination point input by the input unit does not correspond to a toll road or a facility attached to a toll road, the range setting unit sets a range that excludes the ranges of toll roads and facilities attached to toll roads as the at least one of the departure point range and the destination point range.

7. The vehicle information providing device as recited in claim 1, wherein
the range setting unit
extracts information regarding travel start points and travel end points of the plurality of vehicles from the driving history information accumulated in the history information accumulation unit, and
determines the size of at least one of the departure point range and the destination point range according to a number of the travel start points and the travel end points that are located in a vicinity of the at least one of the departure point and the destination point input by the input unit.

8. The vehicle information providing device as recited in claim 1, wherein
the range setting unit determines the size of the departure point range and the size of the destination point range according to the distance between the departure point and the destination point input by the input unit.

9. The vehicle information providing device as recited in claim 1, wherein
the range setting unit determines the size of the departure point range and the size of the destination point range according to a time required to reach the destination point from the departure point input by the input unit.

* * * * *